(12) United States Patent
Burli

(10) Patent No.: US 11,301,503 B2
(45) Date of Patent: Apr. 12, 2022

(54) AUTONOMOUS CONTENT ORCHESTRATION

(71) Applicant: ServiceNow, Inc., Santa Clara, CA (US)

(72) Inventor: Badarinarayan Parthasarathi Burli, Bengaluru (IN)

(73) Assignee: ServiceNow, Inc., Santa Clara, CA (US)

( * ) Notice: Subject to any disclaimer, the term of this patent is extended or adjusted under 35 U.S.C. 154(b) by 174 days.

(21) Appl. No.: 16/925,879

(22) Filed: Jul. 10, 2020

(65) Prior Publication Data
US 2022/0012272 A1    Jan. 13, 2022

(51) Int. Cl.
*G06F 7/00* (2006.01)
*G06F 16/33* (2019.01)
(Continued)

(52) U.S. Cl.
CPC ...... *G06F 16/3344* (2019.01); *G06F 16/3346* (2019.01); *G06F 16/35* (2019.01); *G06N 5/04* (2013.01); *G06N 20/00* (2019.01)

(58) Field of Classification Search
CPC .. G06F 16/3344; G06F 16/35; G06F 16/3346; G06F 16/3329; G06F 16/3335;
(Continued)

(56) References Cited

U.S. PATENT DOCUMENTS

| 4,941,084 A | 7/1990 | Terada et al. |
| 5,185,860 A | 2/1993 | Wu |

(Continued)

FOREIGN PATENT DOCUMENTS

| EP | 0433979 | 6/1991 |
| EP | 1607824 | 12/2005 |

(Continued)

OTHER PUBLICATIONS

Wikipedia tf-idf, https://en.wikipedia.org/wiki/Tf%E2%8O%93idf.
Burli, U.S. Appl. No. 16/562,080, filed Sep. 5, 2019.

*Primary Examiner* — Mohammad A Sana
(74) *Attorney, Agent, or Firm* — McDonnell Boehnen Hulbert & Berghoff LLP

(57) ABSTRACT

A system could include persistent storage units. Each persistent storage unit could contain: (i) records including descriptions related to technology-related problems, and (ii) term frequency (TF) metrics for tokens within the descriptions. The system could include processors configured to perform operations. The operations may include receiving input text and determining that the input text is subject to a querying procedure. The operations could also include, in response to the determining, identifying a classification for the input text and based on the classification, selecting at least one of the persistent storage units. The operations could further include tokenizing the input text to form input tokens and calculating, for the input tokens, input TF metrics. The operations could additionally include determining similarity metrics between: (i) the input TF metrics, and (ii) TF metrics for records within the at least one persistent storage unit and, based on the similarity metrics, retrieving relevant records.

20 Claims, 17 Drawing Sheets

(51) Int. Cl.
*G06N 5/04* (2006.01)
*G06N 20/00* (2019.01)
*G06F 16/35* (2019.01)

(58) Field of Classification Search
CPC .... G06F 16/48; G06F 16/483; G06F 16/2455; G06F 16/2457; G06F 40/284; G06F 40/10; G06N 20/00; G06N 5/04
See application file for complete search history.

(56) References Cited

U.S. PATENT DOCUMENTS

| | | |
|---|---|---|
| 5,237,518 A | 8/1993 | Sztipanovits et al. |
| 5,261,097 A | 11/1993 | Saxon |
| 5,265,065 A * | 11/1993 | Turtle ............... G06F 16/3346 707/999.005 |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2016/0142787 A1* | 5/2016 | Mohamed .......... H04N 21/4828 725/53 |
| 2017/0364504 A1* | 12/2017 | Dandapat .............. G06F 40/279 |
| 2018/0293294 A1* | 10/2018 | Huang ................... G06F 16/00 |
| 2019/0349321 A1* | 11/2019 | Cai ....................... G06F 40/237 |
| 2019/0377736 A1* | 12/2019 | Balasubramanian ....................... G06F 16/285 |
| 2020/0279017 A1* | 9/2020 | Norton ................... G06F 16/36 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

\* cited by examiner

700

| ORIGINATOR | BOB SMITH | ← 702 |
|---|---|---|
| CREATED | 2018-02-07 9:56AM | ← 704 |
| SHORT DESCRIPTION | CAN'T CONNECT TO EMAIL | ← 705 |
| PROBLEM DESCRIPTION | MY EMAIL CLIENT IS NOT DOWNLOADING NEW EMAILS. I AM CONNECTED TO THE WIRELESS NETWORK AND CAN ACCESS THE INTERNET, BUT MY CLIENT KEEPS REPORTING THAT IT IS UNABLE TO ACCESS THE SERVER. | ← 706 |
| CATEGORY | EMAIL | ← 708 |
| ASSIGNED TO | ALICE JONES | ← 710 |
| STATUS | RESOLVED | ← 712 |
| RESOLUTION | BOB'S LAPTOP WAS CONNECTED TO THE "GUEST" WIRELESS NETWORK, WHICH IS OUTSIDE OF THE FIREWALL. I TOLD HIM THAT HE COULD EITHER USE THE VPN TO ACCESS HIS EMAIL, OR CONNECT TO THE "EMPLOYEE" WIRELESS NETWORK, WHICH REQUIRES THE PASSWORD BUT IS INSIDE THE FIREWALL. | ← 714 |
| RESOLVED TIME | 2018-02-07 10:10AM | ← 716 |
| CLOSURE CODE | SOLVED (PERMANENTLY) | ← 718 |
| NOTES | THIS IS THE THIRD TIME IN A WEEK THAT I'VE HAD TO ADDRESS A SIMILAR ISSUE. CAN WE POST WIRELESS NETWORKING INSTRUCTIONS IN ALL CONFERENCE ROOMS? | ← 720 |
| LINK TO KNOWLEDGEBASE | ITKB/WIRELESS/CONFIGURATION.HTML | ← 722 |

FIG. 7A

| SENDER | RECIPIENT | TIME | CONTENT |
|---|---|---|---|
| ALICE | BOB | 2019-08-11:09:23:05 | HI, I WOULD LIKE TO ORDER A NEW LAPTOP |
| BOB | ALICE | 2019-08-11:09:23:12 | THANKS FOR YOUR REQUEST, ALICE! I WILL BE HAPPY TO HELP YOU ORDER A NEW LAPTOP. DO YOU WISH TO STAY WITH YOUR CURRENT OPERATING SYSTEM OR TRY A NEW ONE? |
| ALICE | BOB | 2019-08-11:09:35:51 | I THINK I'D PREFER TO STAY WITH WINDOWS |
| BOB | ALICE | 2019-08-11:09:36:10 | OK, SOUNDS GOOD. WE HAVE THREE OPTIONS IN TERMS OF SCREEN SIZE AND MEMORY: 13" WITH 4GB OF RAM, 15" WITH 6GB OF RAM, AND 17" WITH 8GB OF RAM. |
| ALICE | BOB | 2019-08-11:09:38:27 | I'LL TAKE THE MIDDLE OPTION |
| BOB | ALICE | 2019-08-11:09:38:34 | GREAT! WE WILL PROCURE A NEW WINDOWS LAPTOP WITH A 15" SCREEN AND 6GB, AND WILL SHIP IT TO YOUR LOCATION TOMORROW. |

| USER 321: | JUN 30, 2019 8:04PM CST |

I CAN'T SEEM TO FORWARD EMAILS WITH ATTACHMENTS... THE ATTACHMENTS GET REMOVED WHEN I HIT SEND

| USER 123: | JUN 30, 2019 8:06PM CST |

THE ATTACHMENTS DON'T SHOW UP IN THE DRAFT FORWARD EMAIL?

| USER 321: | JUN 30, 2019 8:04PM CST |

NO, THEY'RE THERE WHEN THE WINDOW COMES UP. BUT THE RECIPIENTS DON'T RECEIVE THE ATTACHMENTS.

| TECH: | JUN 30, 2019 8:04PM CST |

ARE THE ATTACHMENTS THERE IN YOUR SENT EMAILS?

| USER 321: | JUN 30, 2019 8:06PM CST |

YES.

FIG. 7C

AUTONOMOUS CONTENT ORCHESTRATION

BACKGROUND

An enterprise may outsource certain aspects of its network and operations to a remote network management platform. This platform may include one or more computational instances with computing resources dedicated or partially dedicated to the enterprise.

When a user from the enterprise or from another network experiences a problem with the remote network management platform, that problem has likely occurred before. The remote network management platform may keep records of such problems in order to track and organize their resolution, facilitate management of technical aspects of the problem, or provide some other benefit. One or more of these records may contain text-based descriptions relevant to the resolution of the user's problem. However, the remote network management platform may contain a large quantity of these records and may store these records in disparate locations. Accordingly, finding relevant records to address the user's problem may be technically difficult and unduly time consuming.

SUMMARY

Users may experience technical problems related to the operation of/services provided by a remote network management platform. As one example, a user could experience a performance problem that causes a software application hosted by the remote network management platform to perform in an unintended way. As another example, a user could experience a licensing problem related to rights allocations associated with software applications hosted by the remote network management platform. Other problems are also possible.

Upon experiencing a problem, a typical resolution involves a user submitting a support ticket to an entity associated with the remote network management platform. An agent from the entity may be assigned to troubleshoot the problem raised by the ticket. In a typical troubleshooting process, the assigned agent may examine text contained within the ticket in an attempt to identify a solution that could address the problem. Yet, formulating an appropriate solution may take days or even weeks, as the agent may have limited resources with which to address the problem. And through all that time, the problem raised by the ticket could negatively impact the activity of the user.

Often times though, a problem affecting a particular user is likely to have occurred many times to many different users. And such frequently occurring problems are likely to have similar resolutions. Consequently, it can be beneficial to apply a querying procedure to find, within records related to frequently occurring problems, text-based descriptions that may be helpful in diagnosing and/or resolving newly-occurring problems. Such text-based descriptions may include incident reports, online chat records, online discussion forums, resolution summaries, ticket elevation notices, notes related to the diagnosis and/or resolution of a problem, knowledgebase articles, and so on.

To facilitate such a querying procedure, a remote network management platform may include databases that contain records related to operations of the remote network management platform and/or perhaps some other information technology systems. Users could thus query these databases to identify records that contain text-based descriptions that may be relevant to resolve a problem represented in the query. Such queries could take the form of input text that is entered into web interfaces supplied by the remote network management platform. As such, rather than just examining a ticket in an attempt to identify a solution, an agent could also query the databases to locate records which may be relevant in addressing the problem raised by the ticket. This could advantageously reduce the time it takes for the agent to address the problem. Additionally, users could query the databases themselves in an attempt to solve their own problems (e.g., as part of a process provided to guide users to solve their own problems before escalating to an agent). This could advantageously reduce the number of problems that are escalated to agents, thus allowing the agents to focus on other, potentially higher-level issues. Other advantages may also exist.

However, given the volume of records in such databases (millions of records for large enterprises), one technical problem is that may be difficult to conduct efficient searches of records. For instance, some querying processes may return some useful results, but also may return many non-useful results, thus requiring additional effort to find the useful results within the entire corpus of search results.

Further, another problem is that input text entered into the aforementioned web interfaces may not always be subject to a querying procedure. For example, users could enter into the web interfaces a knowledgebase article that does not contain a problem therein. In such a situation, it may be beneficial to refrain from querying the databases and instead store the knowledgebase article for later use in resolving newly-occurring problems. Accordingly, a remote network management platform would need to determine whether input text contains "unsolved content" (i.e., contains textual content that is subject to a querying procedure) or "solved content" (i.e., contains textual that is not subject to a querying procedure.)

To address the problems above, a remote network management platform may include a content orchestration engine that could receive input text and determine whether the input text contains "solved content" or "unsolved content." If the input text contains "solved content", the content orchestration engine could determine various metrics for the input text and then could store those metrics. These stored metrics may be later utilized for efficient querying. If the input text contains "unsolved content", the content orchestration engine could determine various features for the input text and then could utilize those features to determine records containing text-based descriptions that are relevant to the content of the input text.

Accordingly, a first example embodiment may involve a system. The system may include one or more persistent storage units. Each of the one or more persistent storage units could contain: (i) a plurality of records that include text-based descriptions related to technology-related problems experienced by users, and (ii) term frequency metrics for text-based tokens identified within the text-based descriptions. The system could also include one or more processors configured to perform operations. The operations could include receiving, from a source device, input text. The operations could additionally include determining that the input text is subject to a querying procedure. The operations could also include, in response to determining that the input text is subject to the querying procedure, identifying a classification for the input text. The operations could further include, based at least on the classification, selecting at least one of the one or more persistent storage units. The operations could even further include tokenizing the input text to form a set of input text-based tokens for the input text. The operations could also include calculating, for the set of input text-based tokens, input term frequency metrics. The operations could additionally include determining similarity metrics between: (i) the input term frequency metrics, and (ii) term frequency metrics for records disposed within the at least one selected persistent storage unit. The operations could further include, based on the similarity metrics, retrieving, from the at least one selected persistent storage unit, a relevant set of the records. The operations could also include providing, to the source device and from the relevant set of the records, text-based descriptions.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7A depicts an incident report, in accordance with example embodiments.

FIG. 7B depicts an online chat record, in accordance with example embodiments.

FIG. 7C depicts an online discussion forum, in accordance with example embodiments.

DETAILED DESCRIPTION

Figure 1:
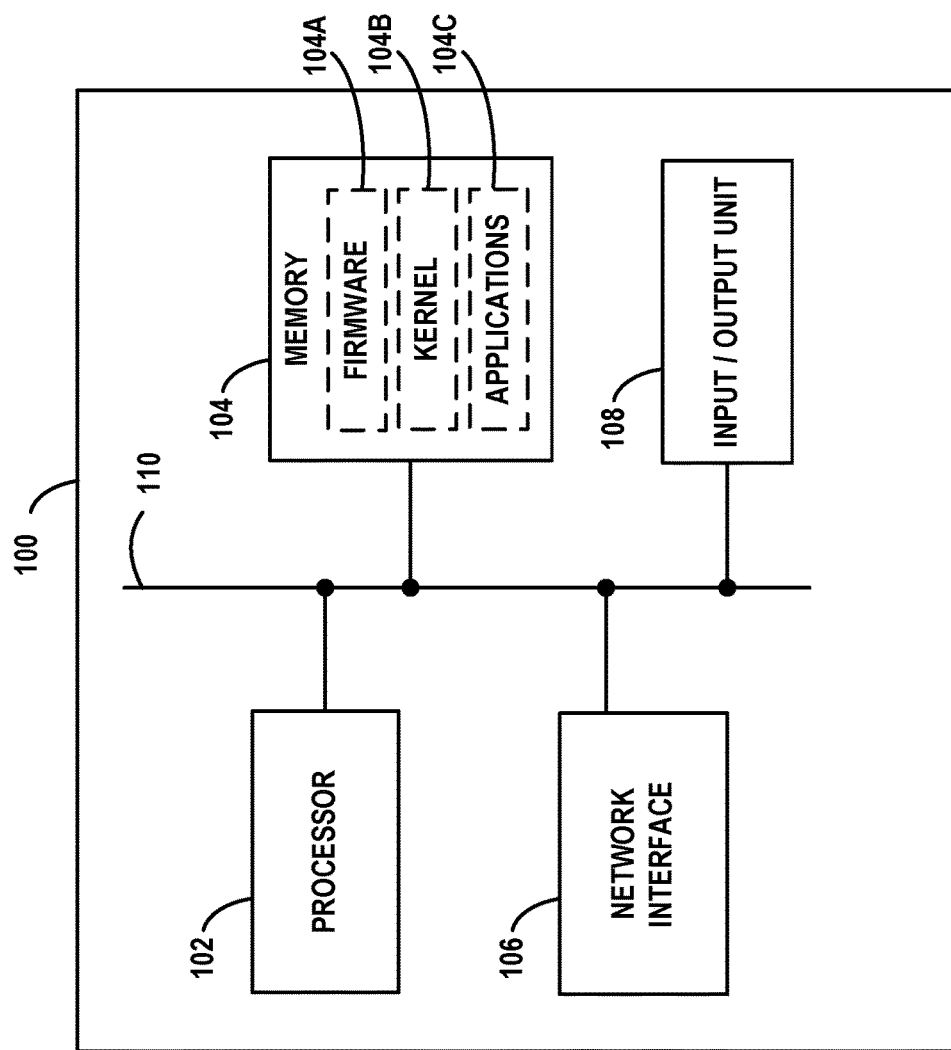
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
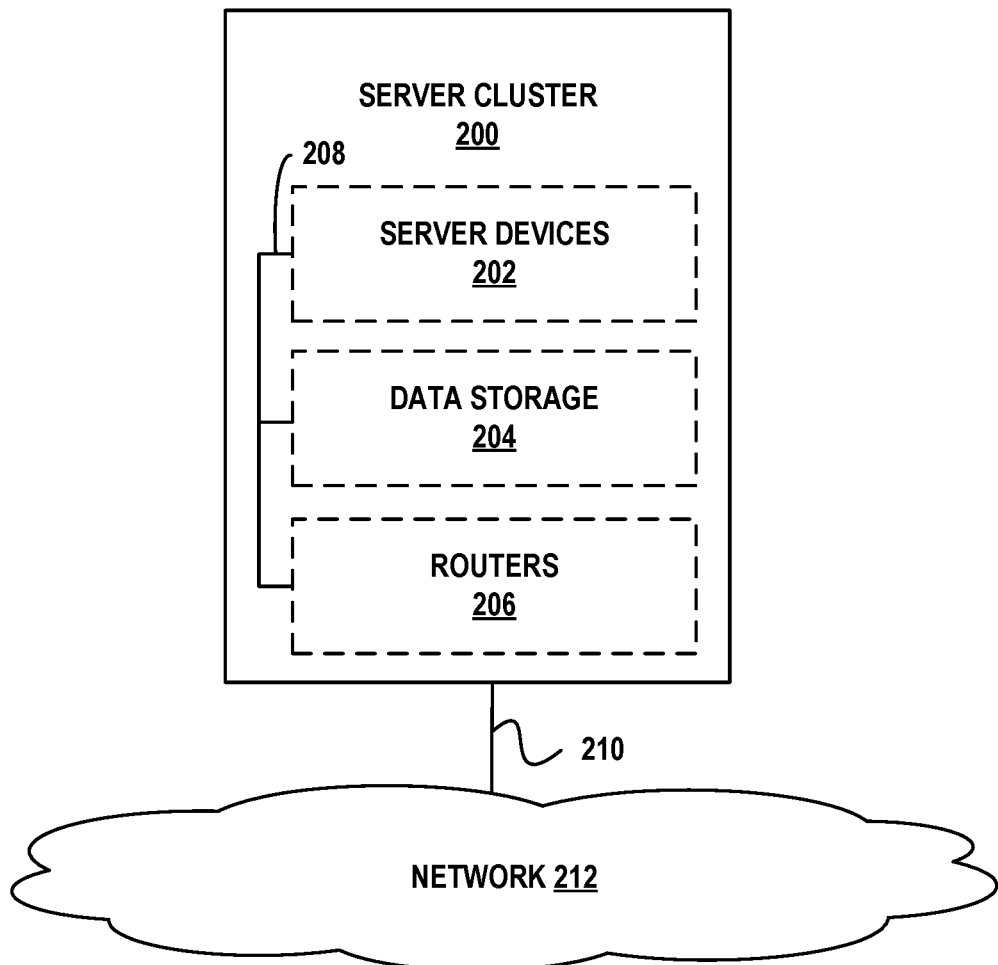
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
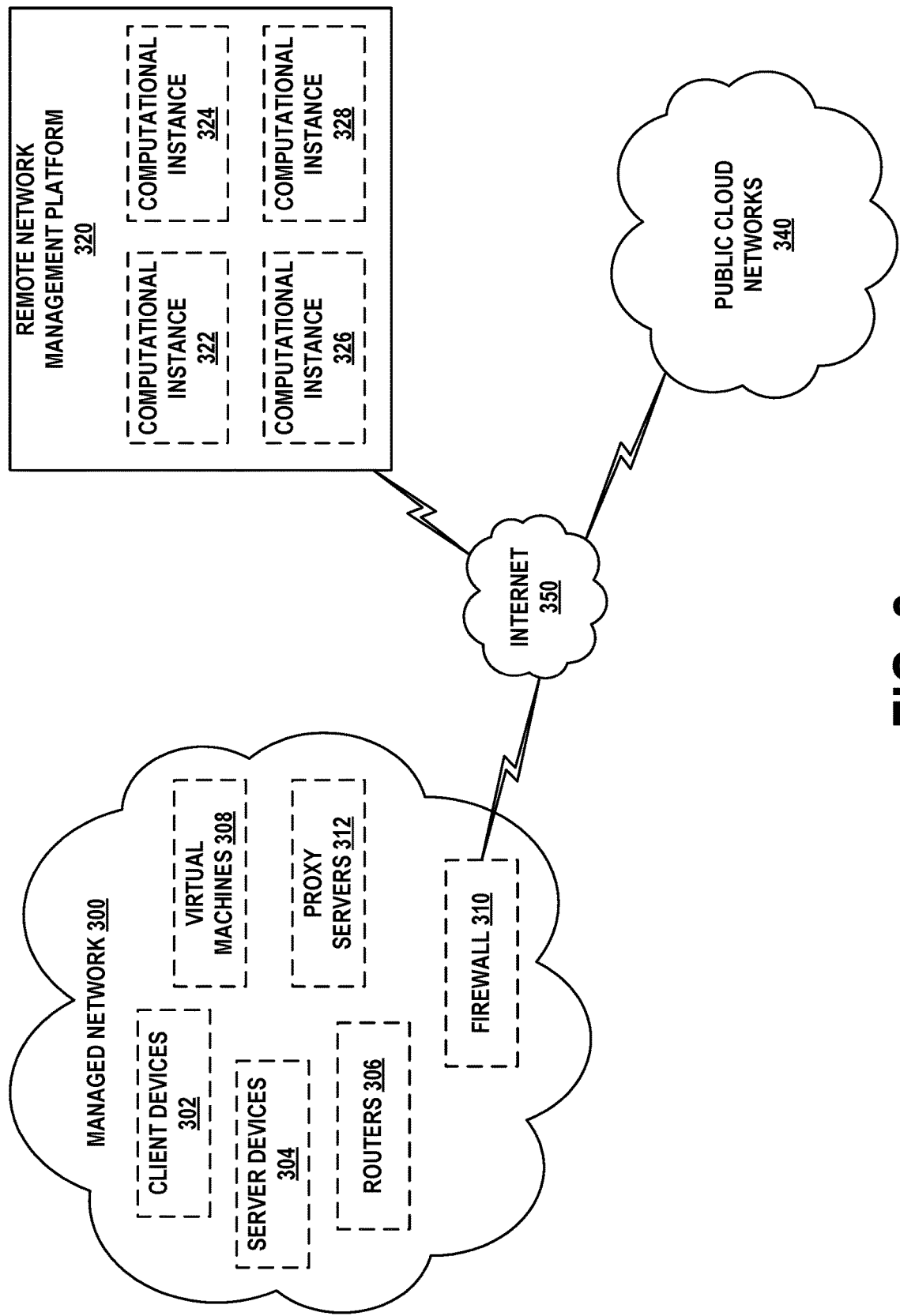
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
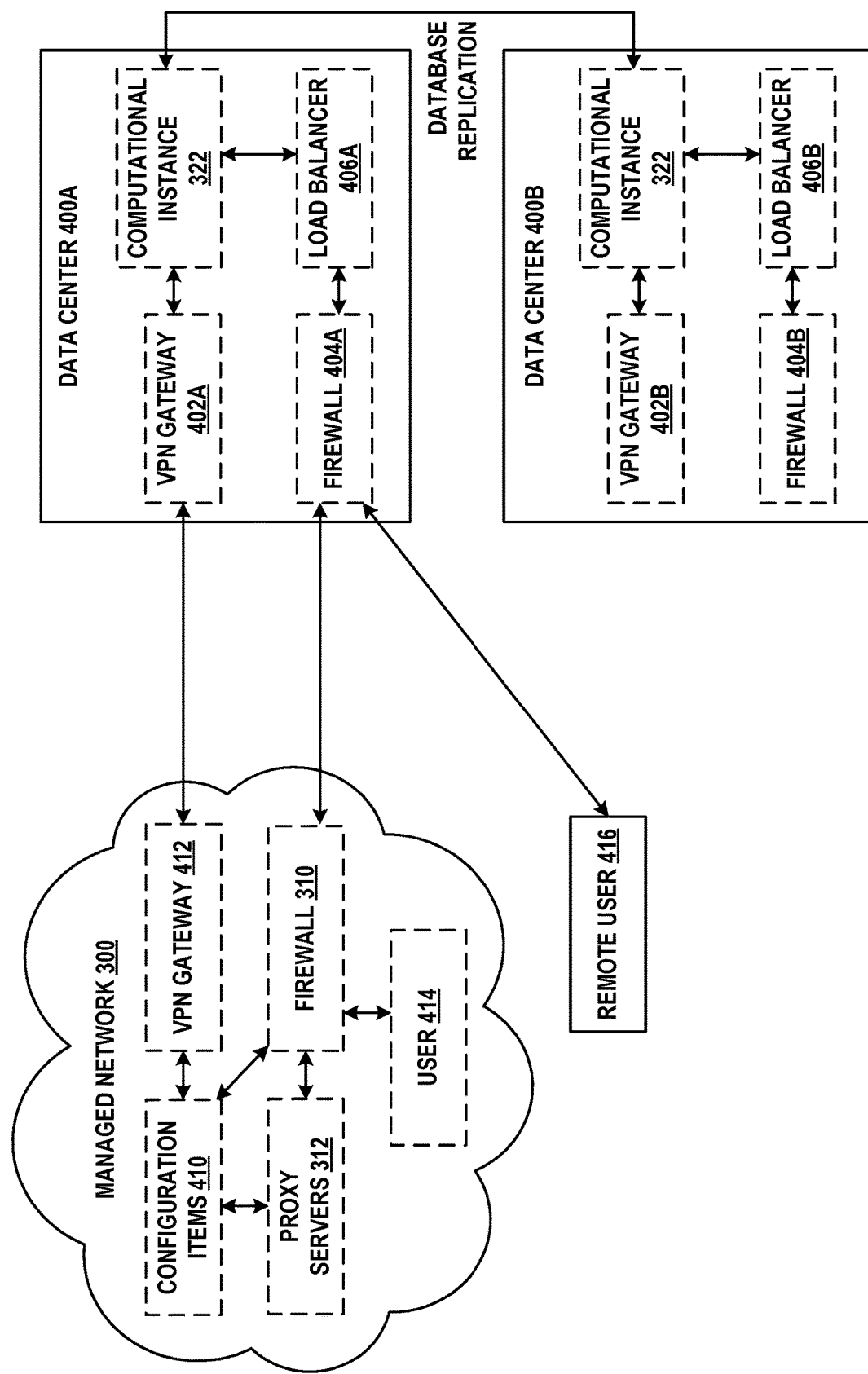
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
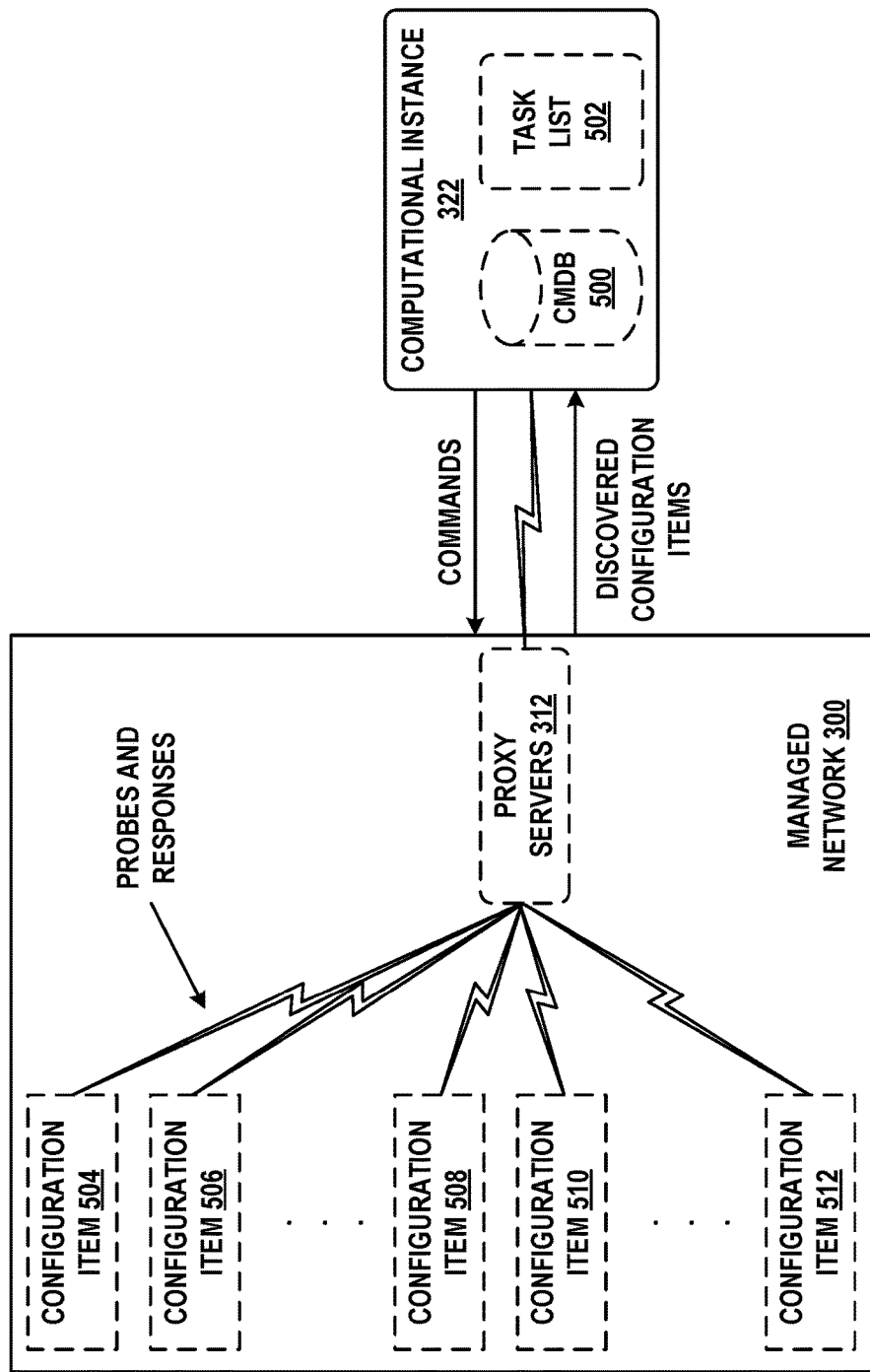
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
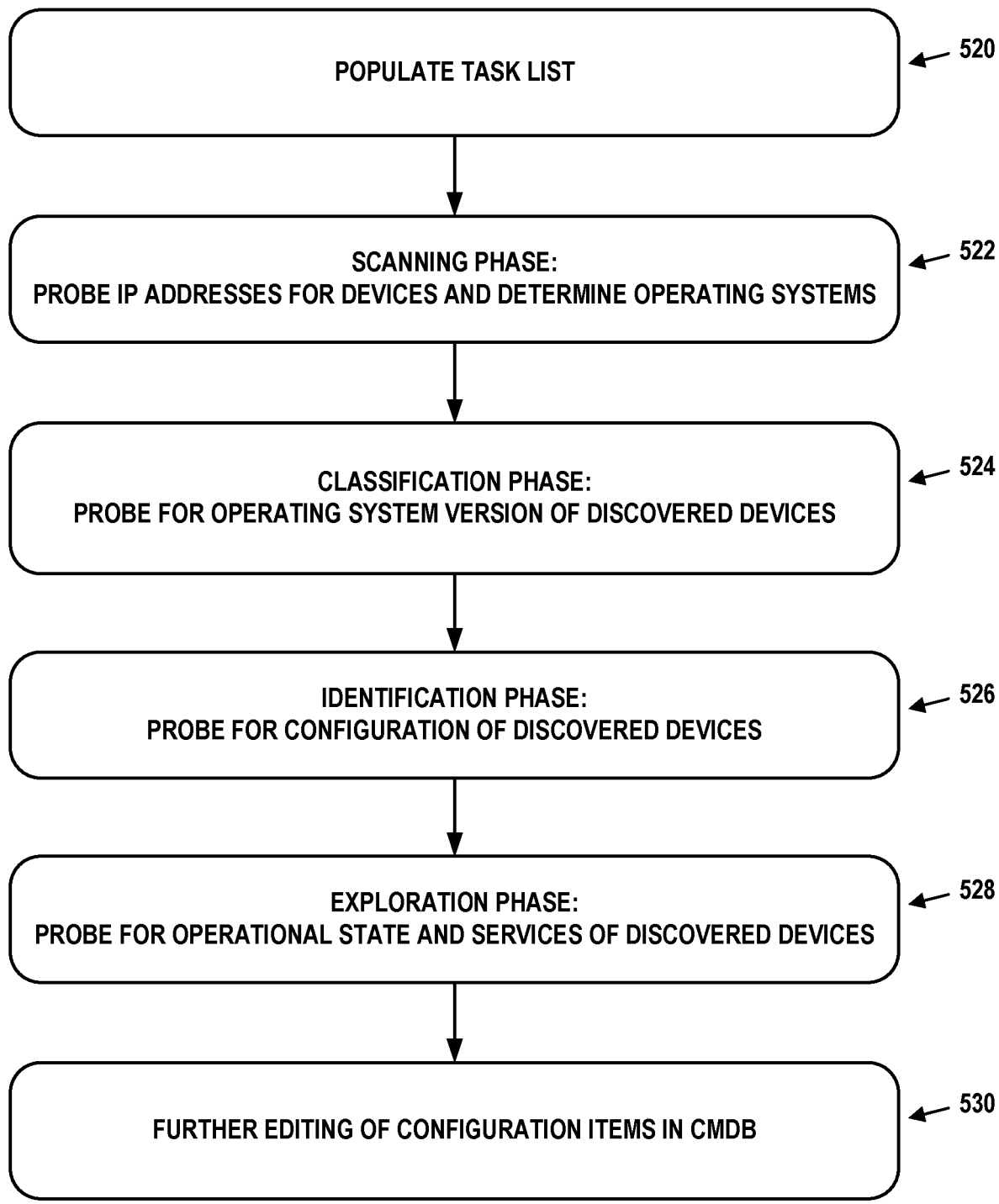
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on." Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. MACHINE LEARNING SYSTEMS AND INTEGRATION

Machine learning (ML) encompasses a family of computational techniques that can be integrated into a remote network management platform in a number of ways. For example, a central computational instance may provide ML training (e.g., generation of ML models) and/or production (e.g., execution of ML models against specified input) on behalf of one or more computational instances. Alternatively, the computational instances may operate the ML training and/or ML production themselves. ML techniques can be used in the management and processing of IT records, for example. These IT records may include incident reports, online chat records, online discussion forums, and knowledgebase articles, among other possibilities.

Regardless, the development cycle for ML systems differs significantly from that of traditional programming. Throughout most of the existence of software engineering, programs were developed according to the process illustrated by FIG. 6A. A program 600 was written and tested so that it could receive production input 602 and produce production output 604. Here, "production input" refers to input found in real-world deployments of program 600, and "production output" refers to the output generated by program 600 in response to receiving production input.

Figure 6A:
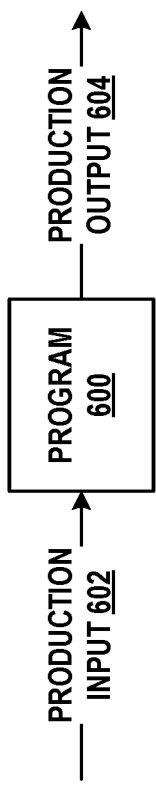
FIG. 6A depicts a traditional programming procedure, in accordance with example embodiments.

Not shown in FIG. 6A is any testing input and its associated testing output that may be used in a similar fashion during development and testing procedures of program 600. Any such testing input could be synthetically or manually generated, for example, with the goal of ensuring that program 600 behaves as expected when subjected to a range of input.

The development of program 600 involves a human programmer considering possible values of production input 602 and determining what production output 604 should be generated as a result of processing this input. In other words, production input 602 is assumed to be well-defined, and the transformation that maps production input 602 to production output 604 is assumed to be tractable enough to specify algorithmically. More formally, if i represents production input 602 and o represents desired production output 604, the goal of developing program 600 is to develop a function, $f$, such that $o=f(i)$.

But not all problems can be characterized in a fashion that is conducive to such a mapping. For example, so-called "NP hard" problems do not have polynomial-time solutions, and the best that one can hope for are polynomial-time approximations that produce sufficient solutions most of the time. But these approximation algorithms are often difficult to design and develop. A specific class of problems that has proven challenging for traditional programming techniques is those that attempt to simulate complex human sensory processing, such as speech recognition, natural language processing, image recognition, and so on.

Figure 6B:
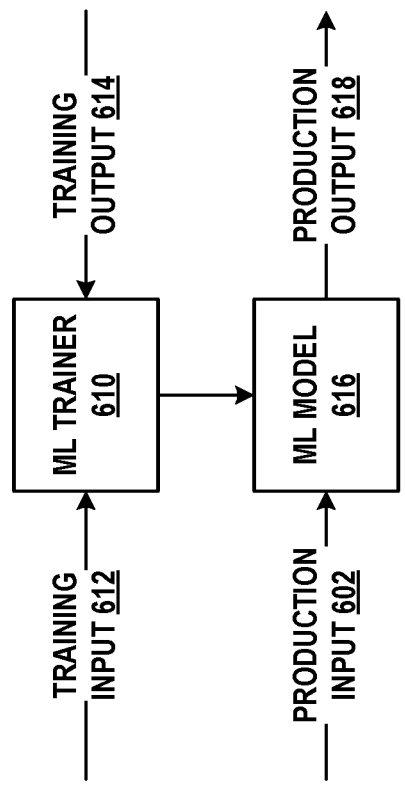
FIG. 6B depicts a machine learning procedure, in accordance with example embodiments.

FIG. 6B depicts a different software engineering process. An ML trainer 610 is a program that takes in training input 612 and training output 614. There often is a one-to-one mapping between each unit of training input 612 and a unit of training output 614, though more complex mappings are possible. Further, it is assumed that training input 612 and training output 614, which are usually combined into a single training data set, are quite large with a significant number of such mappings (e.g., hundreds, thousands, or even millions). This training data set may be referred to as having labeled data, in that each input is labeled with its respective ground-truth or desired output value.

The goal of ML trainer 610 is to iteratively (or otherwise) analyze the mappings to build a computational ML model 616 (e.g., an algorithm) that can, with high probability, produce the training output 614 from training input 612. In other words, for each unit of training input 612, the associated unit of training output 614 (or a result sufficiently close thereto) will be produced in the vast majority of instances. Furthermore, ML model 616 may be able to produce desirable output even from input that was not used during its training. In other words, given known input i and known output o, the goal is to algorithmically find function $f$ where $o \approx f(i)$.

This is an example of supervised training. Training may also be unsupervised, in that there is no known output mapping to the inputs, and instead the inputs are classified based on their own inherent characteristics. Examples of unsupervised training techniques include principle component analysis and clustering.

The types of ML models, as well as methods through which these ML models can be trained, vary dramatically. For instance, ML model 616 could include an artificial neural network, decision tree, random forest, support vector machine, Bayes classifier, k-means clusterer, linear regression predictor, and so on. But the embodiments herein may be operable with any type of ML technique.

Once tested, ML model 616 may be placed into production. Thus, like program 600, ML model 616 may receive production input 602. However, ML model 616 may produce production output 618 that is different from production output 604. As alluded to above, a well-trained ML model can often produce production output that is roughly equivalent to or superior to that of a traditionally-developed algorithm.

Nonetheless, training ML model 616 can be highly sensitive to the quality of training input 612 and training output 614. If the training data set does not supply a sufficient amount of data or data with sufficiently representative distributions of data, ML model 616 may fail to produce meaningful output. For example, if a particular parameter of the training data set is constant, then ML model 616 may not be able to produce desirable production output when this parameter takes on other values.

VI. NATURAL LANGUAGE PROCESSING OF TEXTUAL INFORMATION WITH IT APPLICATIONS

Natural language processing is a discipline that involves, among other activities, using computers, often with ML applications, to determine the structure and meaning of human language. This determined structure and meaning may be particularly applicable to and useful for the searching, organizing, and management of IT records, as described below. In this section, three types of IT records are discussed: incident reports, online chat records, online discussion forums and knowledgebase articles. But the embodiments herein may apply to other types of IT records.

A. Incident Reports

Incident reports are often opened by users to describe a problem that they have experienced. Each incident report may also be referred to as a record. While incident reports may exist in various formats and contain various types of information, an example incident report 700 is shown in FIG. 7A. Incident report 700 consists of a number of fields in the left column, at least some of which are associated with values in the right column.

Field 702 identifies the originator of the incident, in this case Bob Smith. Field 704 identifies the time at which the incident was created, in this case 9:56 AM on Feb. 7, 2018. Field 705 is a text string that provides a short description of the problem. Field 706 is a description of the problem, as provided by the originator. Thus, field 706 may be a free-form text string containing anywhere from a few words to several sentences or more. Field 708 is a categorization of the incident, in this case email. This categorization may be provided by the originator, an agent to whom the incident is assigned, or automatically based on the context of the problem description field.

Field 710 identifies the agent to whom the incident is assigned (if applicable), in this case Alice Jones. Field 712 identifies the status of the incident. The status may be one of "open", "assigned", "working", or "resolved" for instance. Field 714 identifies how the incident was resolved (if applicable). This field may be filled out by the agent to whom the incident is assigned or another individual. Field 716 identifies the time at which the incident was resolved, in this case 10:10 AM on Feb. 7, 2018. Field 718 specifies the closure code of the incident (if applicable) and can take on values such as "closed (permanently)", "closed (work around)", "closed (cannot reproduce)", etc. Field 720 identifies any additional notes added to the record, such as by the agent to whom the incident is assigned. Field 722 identifies a link to an online article that may help users avoid having to address a similar issue in the future. Field 722 might not be filled out in all records.

Incident report 700 is presented for purposes of example. Other types of incident reports may be used, and these reports may contain more, fewer, and/or different fields.

Incident reports, such as incident report 700, may be created in various ways. For instance, by way of a web form, an email sent to a designated address, a voicemail box using speech-to-text conversion, and so on. As these incident reports may be helpful for identifying common types of problems, IT records of incident reports may be stored in a database or table therein that can be queried.

B. Online Chat Records

Online chat systems are one-to-one, one-to-many, or many-to-many messaging applications that allow users to communicate with one another using text, audio, images, and/or video. In some cases, one or more users may join a chat room, and messages that each user types into a text entry box may be transmitted to all users in the room. This allows information to be shared in a semi-real-time manner, more quickly and interactively than via email for example.

In some examples, a remote network management platform may allow users to confer with agents by way of such online chat systems. Incoming chat requests may be queued for servicing by agents when the latter become available. Once engaged, the chat session may involve back-and-forth messaging between the user and the agent. As these messages may be helpful for auditing purposes, as well as for identifying common types of problems, IT records of online chats may be stored in a database or table therein that can be queried.

In some cases, a remote network management platform may use virtual agents. A virtual agent is a program that simulates a live human agent by using pre-defined or dynamically generated messages arranged in a conversation flow that is intended to answer a user's question or solve a user's problem. In some cases, all incoming chat requests may be initially answered by virtual agents that will either address the user's request or hand off the chat to a human agent.

As an example, FIG. 7B depicts online chat record 730. It consists of several messages between participants Alice and Bob. Bob might or might not be a virtual agent. Each message in online chat record 730 includes indications of the sender 732, the recipient 734, a timestamp 736 of when the message was sent, and the content 738 of the message.

C. Online Discussion Forums

In some examples, a remote network management platform may allow users to confer with each other/with agents by way of online discussion forums. Such forums may allow users to post questions/answer other user's questions through a text based interface. As these messages may be helpful for identifying common types of problems, IT records of online discussion forums may be stored in a database or table therein that can be queried.

As an example, FIG. 7C shows online discussion forum 740, which includes a number of posts between various users and an agent. The posts include text-based descriptions, timestamps indicating when the posts were made, and usernames indicating the user/agents that created the posts.

D. Knowledgebase Articles

Unlike incident reports, online chat records, and online discussion forums, all of which provide some indication of how a specific user's problem or request was resolved, knowledgebase articles are longer, pre-written guides or sets of instructions for addressing certain types of problems. Often, many users have the same technology problems over and over, such as how to reset their passwords, how to access Wifi networks in various locations, and so on. Thus, users or agents may write knowledgebase articles that address these issues. These articles may take the form of flat files, hyperlinked files, database content, or combinations thereof.

In general, knowledgebase articles are longer, more detailed, and more pedagogical than the information in incident reports, online discussion forums, or online chat records. Therefore, they provide a way for users or agents to quickly address common problems. As these knowledgebase articles may be helpful for identifying common types of problems, IT records of knowledgebase articles may be stored in a database or table therein that can be queried.

Figure 7D:
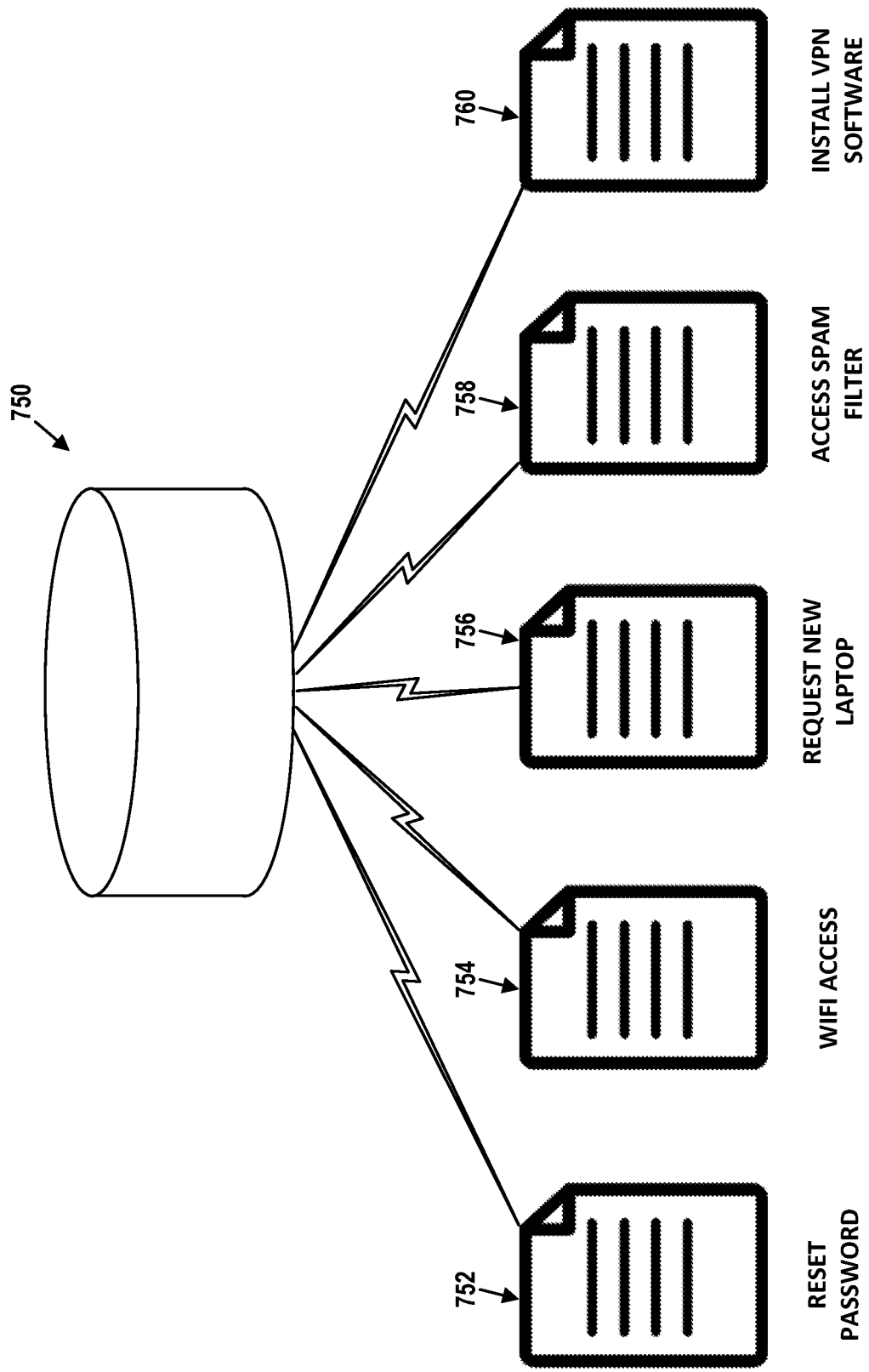
FIG. 7D depicts a knowledgebase, in accordance with example embodiments.

FIG. 7D depicts knowledgebase 750, which may be a database file server, or some other form of storage. Knowledgebase 750 contains five articles 752, 754, 756, 758, and 760, addressing password reset, Wifi access, new laptop requests, spam filter access, and VPN software installation, respectively. Other topics may be present.

VII. EXAMPLE IT RECORD ORCHESTRATION SYSTEMS

Figure 8:
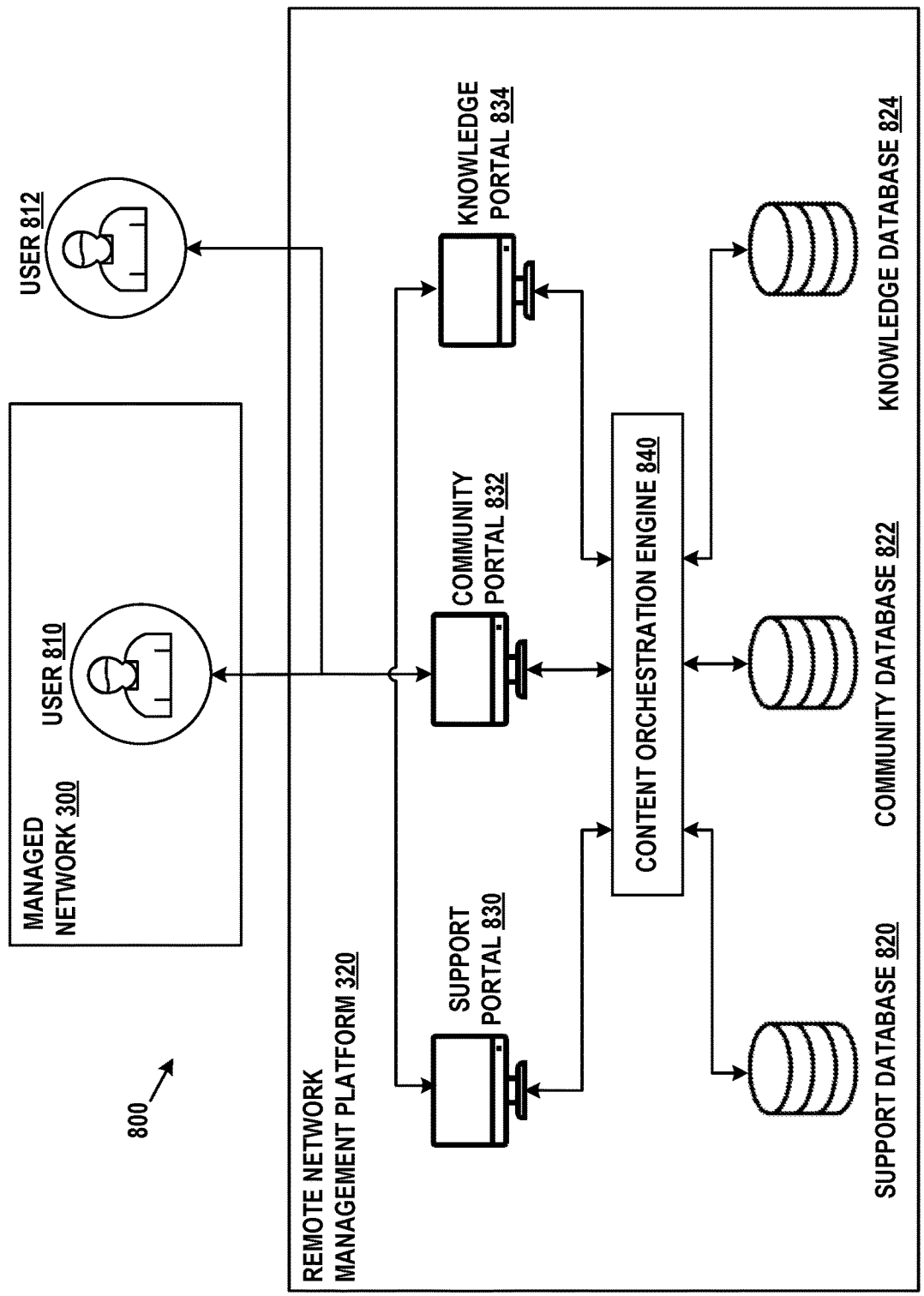
FIG. 8 depicts a network architecture, in accordance with example embodiments.

FIG. 8 depicts network architecture 800, in accordance with example embodiments. Network architecture 800 includes managed network 300 and remote network management platform 320, which may be communicatively connected by way of a network, such as Internet 350.

As discussed above, remote network management platform 320 could be a hosted environment that provides aPaaS services to managed network 300 and/or perhaps other networks. These services may take the form of web-based portals, for example, using the aforementioned web-based technologies. By way of the web-based portals, various users may design, test, and deploy applications, generate reports, view analytics, and perform other tasks.

Managed network 300 may be an enterprise network used by an entity for computing and communication tasks, as well as storage of data. In examples, managed network 300 may utilize services provided by remote network management platform 320.

Users 810 and users 812 can represent people or sources (e.g., another enterprise) that utilize services provided by remote network management platform 320. In example embodiments, users 810 may represent people that work for the entity associated with managed network 300, such as engineers, scientists, managers, accountants, financial analysts, IT staff, and so on, whereas users 812 may correspond to people outside of the entity associated with managed network 300.

In line with the discussion above, users 810 and 812 may experience technical problems related to the operation of/services provided by remote network management platform 320. For example, users 810 and 812 could experience performance problems that cause a software application hosted by remote network management platform 320 to perform in an unintended way. As another example, users 810 and 812 could experience problems related to the discovery process described above. Other types of problems are also possible.

Upon experiencing a problem, a typical resolution procedure involves users 810 and 812 submitting a support ticket to an entity associated with remote network management platform 320. An agent from the entity may be assigned to troubleshoot the problem raised by the ticket. In a typical troubleshooting process, the assigned agent may examine text contained within the ticket in an attempt to identify a solution that could address the problem. Yet, formulating an appropriate solution may take days or even weeks, as the agent may have limited resources with which to address the problem. And through all that time, the problem raised by the ticket could negatively impact the activity of users 810 and 812.

Often times though, a problem affecting users 810 and 812 is likely to have occurred many times to many different users. And such frequently occurring problems are likely to have similar resolutions. Consequently, it can be beneficial to apply a querying procedure that finds, within IT records related to frequently occurring problems, text-based descriptions that may be helpful in diagnosing and/or resolving newly-occurring problems. Such text-based descriptions may include incident reports, online chat records, resolution summaries, ticket elevation notices, notes related to the diagnosis and/or resolution of a problem, knowledgebase articles, and so on.

As such, rather than just examining the text within a ticket in an attempt to identify a solution, an agent could also apply a querying procedure to locate IT records containing text-based descriptions relevant to the problem. This can advantageously reduce the time it takes for the agent to address the problem. Additionally, the querying procedure could be applied by a user looking to solve their own problem (e.g., as part of a process provided to guide users to solve their own problems before escalating to an agent). This could advantageously reduce the number of problems that are escalated to agents, thus allowing the agents to focus on other, potentially higher-level issues. Other advantages may also exist.

To facilitate such a querying procedure, remote network management platform 320 could include support database 820, community database 822, and knowledge database 824, which may be databases and/or other information storage structures that contain IT records. In some cases, support database 820, community database 822, and knowledge database 824 may each store different types of IT records. For instance, support database 820 could contain IT records related to incident reports and online chat records (such as those described in FIGS. 7A and 7B), community database 822 could contain IT records related to online discussion forums (such as those described in FIG. 7C), and knowledge database 824 could contain IT records related to knowledgebase articles (such as those described in FIG. 7D). Other databases containing other types of IT records may also exist.

In practice, users 810 and 812 could query support database 820, community database 822, and/or knowledge database 824 to identify IT records containing text-based descriptions that may be relevant to resolve the problem represented in the query. Such queries could take the form of input text that is entered into support portal 830, community portal 832, and/or knowledge portal 834, each of which may be web interfaces supplied by remote network management platform 320.

Upon receiving the input text, support portal 830, community portal 832, and/or knowledge portal 834 could convert the input text into a corresponding database query (e.g., an SQL query). For example, if the input text is "email", support portal 830, community portal 832, and/or knowledge portal 834 could convert the input text into an SQL query that looks for any IT record containing matching text; i.e., includes the word "email." Thus, IT records having the text "My email client is not downloading new emails", "Email crashed", and "Can't connect to email" may be returned, while an IT record having the text "VPN timed out" may not be returned. Alternatively and/or additionally, the queries may be automatically formed (e.g., without a user explicitly entering input text). For example, if an incident report is displayed on support portal 830, an SQL query containing the text thereof may be sent to support database 820, community database 822, and/or knowledge database 824 to identify IT records containing text-based descriptions that may be relevant to resolve the problem represented in the incident report.

Given the volume of records in databases such as support database 820, community database 822, and knowledge database 824 (millions of IT records for large enterprises), one technical problem is that it may be difficult to conduct efficient searches of IT records. For instance, some querying processes may return some useful results, but also may return many non-useful results, thus requiring additional effort to find the useful results within the entire search result. But even among the useful results, some results could be more relevant than others. For example, if a user entered the input text "VPN is down", an IT record containing the phrase "3 Reasons Why Your VPN Might Be Down" may be more relevant than an IT record containing the phrase "What is a VPN?" As another example, if a user entered the input text "What is Discovery?", an IT record originating from knowledge database 824 may be more relevant than an IT record originating from support 820 database 822, or vice versa.

Beyond this, in certain embodiments, input text entered into support portal 830, community portal 832, and/or knowledge portal 834 may not always be subject to a querying procedure. For example, users 810 could enter into knowledge portal 834 a knowledgebase article that includes instructions for addressing certain types of problems. Since the knowledgebase article does not contain a problem therein, it may be beneficial to refrain from performing a querying procedure on the knowledgebase article and instead store the knowledgebase article in knowledge database 824 for later use. To accomplish this, however, remote network management platform 320 would need to determine whether the input text contains "unsolved content" (i.e., contains textual content that is subject to a querying procedure, for example, an incident report, a question on a discussion form, and so on.) or "solved content" (i.e., contains textual content that is not subject to a querying procedure, for example, a blog post, a release note, and so on).

To address the problems above, remote network management platform 320 may include content orchestration engine 840, which could take the form of a background process, an executable application, or the like. During operations, content orchestration engine 840 could receive input text and determine, using variety of ML, non-ML, and/or natural language processing techniques, whether the input text contains "solved content" or "unsolved content." If the input text contains "solved content", content orchestration engine 840 could determine various metrics for the input text and then could store those metrics. These stored metrics may be later utilized for efficient querying of IT records. If the input text contains "unsolved content", content orchestration engine 840 could determine various features for the input text and then could utilize those features to determine IT records containing text-based descriptions that are relevant to the content of the input text.

Notably, the use of content orchestration engine 840 is not a mere automation of a previously-known technique. As outlined above, one of the difficulties experienced by remote network management platform 320 is that agents may troubleshoot a user's problem in an ad-hoc and subjective fashion. Each agent's personal experience may highly influence the steps that the agent takes. Content orchestration engine 840 eliminates this subjectivity by through the use of natural language processing rules and ML models that associate problems to IT records containing text-based descriptions that may be highly relevant in addressing those problems. To that point, it has been observed that these embodiments can successfully prevent over 90% of user problems from being escalated to agents. Further, the actions of content orchestration engine 840 could occur rapidly, often within seconds or minutes, rather than days or weeks as in the case when agents attempt to address problems. Thus, the overall performance and reliability of remote network management platform 320 is greatly enhanced.

Figure 9:
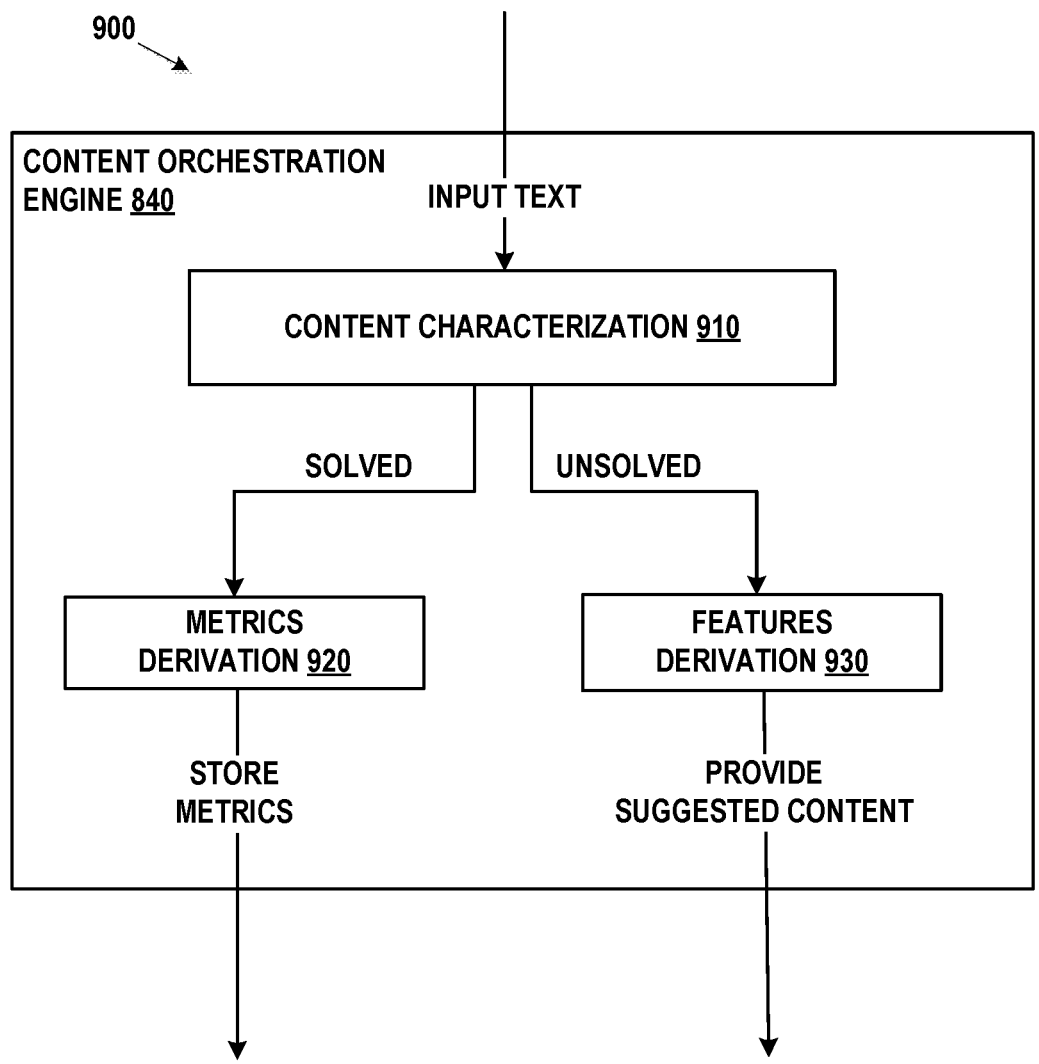
FIG. 9 depicts a procedure, in accordance with example embodiments.

FIG. 9 is a flowchart of procedure 900, in accordance with an example embodiment. Procedure 900 could be carried out by content orchestration engine 840.

Procedure 900 can begin at block 910, where content orchestration engine 840 receives input text IN_TEXT. In line with the discussion above, IN_TEXT could be received by content orchestration engine 840 via support portal 830, community portal 832, and/or knowledge portal 834. For instance, support portal 830, community portal 832, and/or knowledge portal 834 could take the form of web interfaces that contain various locations for users to input textual content. Using these web interface, users could enter IN_TEXT and could transmit IN_TEXT back to remote network management platform 320, where IN_TEXT could be received by content orchestration engine 840. Other ways of entering IN_TEXT could also exist.

In some cases, IN_TEXT is entered by users 810 and 812. In other cases, IN_TEXT is entered by a user associated with the entity that operates remote network management platform 320, for example, a support agent, an application developer, a product manager, and the like.

If content orchestration engine 840 determines that IN_TEXT contains "solved content", procedure 900 could continue to block 920. Otherwise, if content orchestration engine 840 determines that IN_TEXT contains "unsolved content", procedure 900 could continue to block 930. Further details related to block 910 are described below in the context of FIG. 10.

At block 920, content orchestration engine 840 could derive various metrics related to IN_TEXT. This could involve, for example, determining term frequency metrics, usefulness metrics, and/or other types of metrics. After determining the various metrics, content orchestration engine 840 could store the metrics (as well as IN_TEXT) in database, for example, support database 820, community database 822, and knowledge database 824, or perhaps another database disposed within remote network management platform 320. The stored metrics could later be used to efficiently query IT records. Further details related to block 920 are described below in the context of FIG. 11.

At block 930, content orchestration engine 840 could derive various features related to IN_TEXT and then could use those features to determine a classification for IN_TEXT and relevant data sources for IN_TEXT. Using the classification and relevant data sources, content orchestration engine 850 could select a set of IT records that may be relevant to resolve a problem represented in IN_TEXT. Content orchestration engine 840 could then provide the set of relevant IT records to the user that provided IN_TEXT or perhaps another user. For example, content orchestration engine 840 could display the text-based descriptions of the set of relevant IT records on support portal 830, community portal 832, and/or knowledge portal 834, or perhaps on another graphical interface. Further details related to block 930 are described below in the context of FIG. 12.

Note that the blocks represented procedure 900 are used for the purpose of example and are not intended to be limiting with respect to the embodiments herein. Procedure 900 may be highly configurable and may include more blocks, fewer blocks, or different blocks than those depicted in FIG. 9. In some cases, one or more blocks may be customized, or may otherwise deviate from the exemplary description above.

Figure 10:
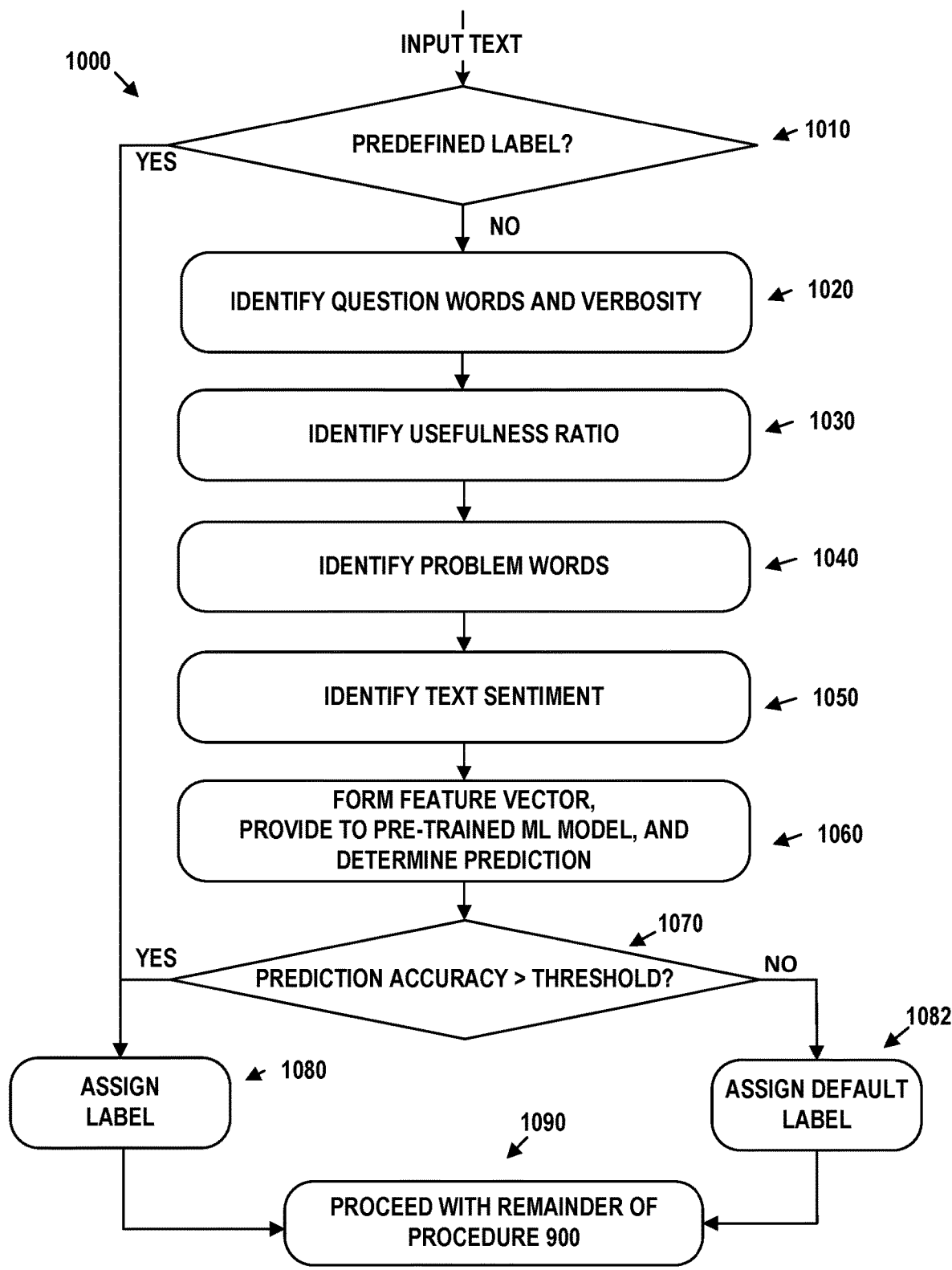
FIG. 10 depicts a procedure related to FIG. 9, in accordance with example embodiments.

FIG. 10 is a flowchart of procedure 1000, in accordance with an example embodiment. Content orchestration engine 840 could perform at least some of the actions of blocks 1010, 1020, 1030, 1040, 1050, 1060, 1070, 1080, 1082 and/or 1090 while performing the content characterization actions of block 910 of procedure 900.

At block 1010, content orchestration engine 840 could determine if input text IN_TEXT has pre-defined label that indicates whether IN_TEXT is "solved content" or "unsolved content." In embodiments herein, a pre-defined label could be assigned to IN_TEXT based on an origination point of IN_TEXT. For example, if IN_TEXT originated from community portal 832 and/or knowledge portal 834, IN_TEXT may have a pre-defined label of "solved content", as both community portal 832 and/or knowledge portal 834 may be used to add, but not query IT records. Conversely, if IN_TEXT originated from support portal 830, IN_TEXT may not have pre-defined label, as support portal 830 may be used to add and query IT records.

If content orchestration engine 840 determines that IN_TEXT has a pre-defined label, then procedure 1000 may continue to block 1080. Otherwise, if content orchestration engine 840 determines that IN_TEXT does not have a pre-defined label, then procedure 1000 may continue to block 1020.

At block 1020, content orchestration engine 840 could identify whether IN_TEXT contains any question words. This could involve, for example, determining whether IN_TEXT contains words with a "WH" prefix and/or whether IN_TEXT contains any question marks. Additionally, at block 1020, content orchestration engine 840 could identify a verbosity metric for IN_TEXT. This could involve, for example, determining the number of unique words in IN_TEXT. Various ML, non-ML, and natural language processing techniques could be utilized to implement the actions of block 1020.

At block 1030, content orchestration engine 840 could identify a usefulness ratio for IN_TEXT. This could involve, for example, calculating a ratio of unique, uncommon words in IN_TEXT to the total number of words in IN_TEXT. The unique, uncommon words could be determined from a pre-defined dictionary of uncommon words. Various ML, non-ML, and natural language processing techniques could be utilized to implement the actions of block 1030.

At block 1040, content orchestration engine 840 could identify whether IN_TEXT contains any "problem words", where the "problem words" are pre-defined within content orchestration engine 840. Example "problem words" could include words such as "issue", "not working", "problem", "complication", and so on. Various ML, non-ML, and natural language processing techniques could be utilized to implement the actions of block 1040.

At block 1050, content orchestration engine 840 could identify a text sentiment for IN_TEXT. This could involve, for example, determining whether IN_TEXT contains textual content that has a positive tone, negative tone, or a neutral tone. Various ML, non-ML, and natural language processing techniques could be utilized to implement the actions of block 1050.

At block 1060, content orchestration engine 840 could form a feature vector using the results from blocks 1020, 1030, 1040, and 1050. Such a feature vector may be an N-dimensional vector that contains numerical representations of the metrics identified at blocks 1020, 1030, 1040, and 1050. In some examples, the N-dimensional vector could use one-hot encodings to represent the metrics. For example, with respect to block 1050, a numerical value of 1 could be used to indicate that IN_TEXT has a positive tone, whereas a numerical value of 0 could be used to indicate that IN_TEXT does not have a positive tone. As another example, with respect to block 1040, a numerical value of 1 could be used to indicate that IN_TEXT contains the word "issue", whereas a numerical value of 0 could be used to indicate that IN_TEXT does not contain the word "issue."

After forming the feature vector, content orchestration engine 840 could provide the feature vector to an ML model that is pre-trained to classify an input feature vector as either "solved content" or "unsolved content." The ML model may take the form of any of the ML models described above in reference to FIG. 6B. By applying the ML model on the feature vector, content orchestration engine 840 could determine: (i) a prediction of whether IN_TEXT contains "solved content" or "unsolved content", and (ii) an accuracy measurement associated with that prediction. The accuracy measurement may be indicative of the confidence in the ML model's prediction.

At block 1070, content orchestration engine 840 could compare the accuracy measurement to a pre-defined acceptance threshold. Example pre-defined acceptance thresholds could include 85%, 90%, or 95%, among other possibilities. If content orchestration engine 840 determines that the accuracy measurement meets or exceeds the pre-defined acceptance threshold, then procedure could continue to block 1080. Otherwise, if content orchestration engine 840 determines that the accuracy measurement does not meet or exceed the pre-defined acceptance threshold, then procedure 900 could continue to block 1082

At block 1080, content orchestration engine 840 could assign the prediction made at block 1060 (or the pre-defined label at block 1010) as a label for IN_TEXT. Procedure 900 could then continue to block 1090.

At block 1082, content orchestration engine 840 could assign a default label to IN_TEXT. In some cases, the default label is "solved content." Other cases, the default label is "unsolved content." In certain embodiments, rather than assigning a default label, content orchestration engine 840 could provide an error message to the user that submitted IN_TEXT, the error messaging requesting that the user re-enter IN_TEXT. Other scenarios are also possible.

At block 1090, content orchestration engine 840 could proceed with the remainder of procedure 900; i.e., complete the procedures of block 910 and continue with the remainder of procedure 900 by proceeding, based on the label of IN_TEXT, to block 920 or block 930.

Note that the blocks represented procedure 1000 are used for the purpose of example and are not intended to be limiting with respect to the embodiments herein. Procedure 1000 may be highly configurable and may include more blocks, fewer blocks, or different blocks than those depicted in FIG. 10. In some cases, one or more blocks may be customized, or may otherwise deviate from the exemplary description above.

Figure 11:
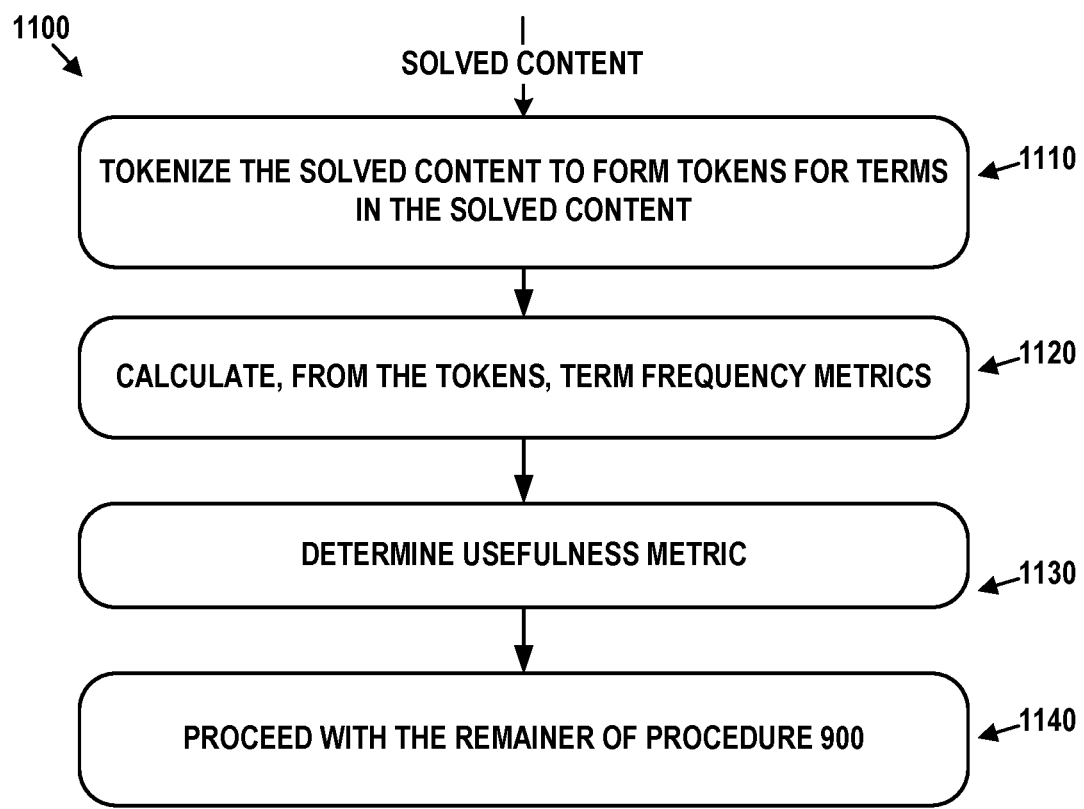
FIG. 11 depicts a procedure related to FIG. 9, in accordance with example embodiments.

FIG. 11 is a flowchart of procedure 1100, in accordance with an example embodiment. Content orchestration engine 840 could perform at least some of the actions of blocks 1110, 1120, 1130, and 1140 while performing the actions of block 920 of procedure 900.

Procedure 1100 may begin at block 1110, where content orchestration engine 840 tokenizes the solved content IN_SOLVED. The tokenizing could involve removing, from IN_SOLVED, common words (e.g., words from a pre-determined corpus of English words), stop words (e.g., words manually selected due to describing generic and/or ambiguous technical topics), punctuation, and/or other elements that are not relevant, or that are less relevant, to the task of identifying IT records.

At block 1120, content orchestration engine 840 could determine respective term frequency metrics for the tokens determined at block 1110. Term frequency metrics could be determined in a variety of ways. In certain examples, the term frequency metrics could be determined based on a number of times a token occurs in IN_SOLVED normalized to a rate of occurrence of that token in some other corpus of textual information (e.g., according to a term frequency-inverse document frequency statistic). For instance, the term frequency metric for a token in IN_SOLVED could be determined based on a product of a (i) number of times that the token appears in IN_SOLVED, and a (ii) logarithm of a quotient of a count of the IT records (e.g., the number of IT records in support database 820, community database 822, and/or knowledge database 824) and a count of the IT records containing the token. This is illustrated by:

$$f_{t,d} \cdot \log \frac{N}{n_t}$$

where $f_{t,d}$ is the number of times the token 't' appears in IN_SOLVED, N is the total number of IT records in support database 820, community database 822, and/or knowledge database 824, and $n_t$ is the number of IT records in support database 820, community database 822, and/or knowledge database 824 in which token 't' appears.

At block 1130, content orchestration engine 840 could determine a usefulness metric for IN_SOLVED. The usefulness metric could be calculated such that it is likely to be low if IN_SOLVED contained little technical content and instead contained mostly common words, words in a list of stop words, and/or punctuation. For example, if IN_SOLVED contained mostly greetings, pleasantries, or other non-technical text, then it would have a low usefulness metric. Conversely, if IN_SOLVED contained many technical terms, program code, API calls, or other technical content, then it would have a high usefulness metric.

In some examples, such a usefulness metric could be determined based on a fraction of IN_SOLVED that is tokenized relative to the total content of the IN_SOLVED (e.g., tokenized content plus common words, stop words, etc.). For example, the usefulness metric could be determined based on a quotient of: (i) a first count of tokens in a tokenized version of the IN_SOLVED that lacks the stop words, common words, and punctuation, and (ii) a second count of tokens in a tokenized version of IN_SOLVED that includes the stop words, common words, and punctuation. This is illustrated by:

$$\frac{m_c^*}{m_c}$$

where $m_c^*$ is the number of tokens in the tokenized version of IN_SOLVED that lacks stop words, common words, and punctuation, and $m_c$ is the number of tokens in the tokenized version of IN_SOLVED that includes the stop words, common words, and punctuation.

At block 1140, content orchestration engine 840 could proceed with the remainder of procedure 900; i.e., complete the procedures of block 920 and continue with the remainder of procedure 900. In line with the discussion above, this could involve content orchestration engine 840 storing the metrics determined at blocks 1120 and 1130 (as well as IN_SOLVED and a perhaps a tokenized version of IN_SOLVED) in database, for example, support database 820, community database 822, and knowledge database 824, or perhaps another database disposed within remote network management platform 320. As described below, these stored metrics could be used later to efficiently query IT records.

Note that the blocks represented procedure 1100 are used for the purpose of example and are not intended to be limiting with respect to the embodiments herein. Procedure 1100 may be highly configurable and may include more blocks, fewer blocks, or different blocks than those depicted in FIG. 11. In some cases, one or more blocks may be customized, or may otherwise deviate from the exemplary description above.

Figure 12:
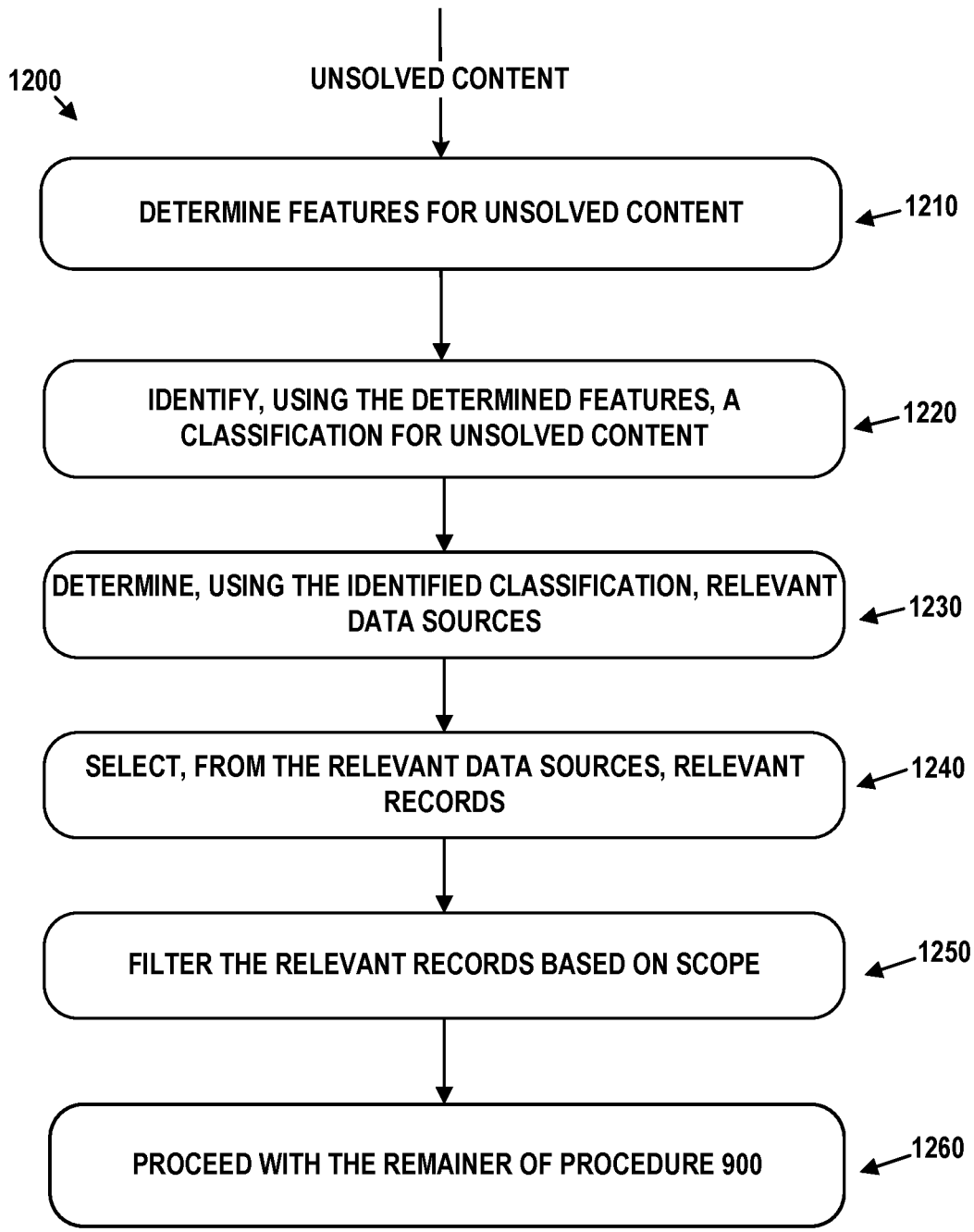
FIG. 12 depicts a procedure related to FIG. 9, in accordance with example embodiments.

FIG. 12 is a flowchart of procedure 1200, in accordance with an example embodiment. Content orchestration engine 840 could perform at least some of the actions of blocks 1210, 1220, 1230, 1240, 1250, and 1260 while performing the actions of block 930 of procedure 900.

Procedure 1200 may begin at block 1210, where content orchestration engine 840 can determine various features for the unsolved content IN_UNSOLVED. In some embodiments, block 1210 involves determining whether any words in IN_UNSOLVED contain a "WH" prefix and/or whether IN_UNSOLVED contains any question marks. In certain embodiments, block 1210 involves determining a verbosity metric for IN_UNSOLVED. In some embodiments, block 1210 involves determining whether IN_UNSOLVED contains any key words from a list of pre-defined key words. Example key words could include words such as "issue", "not working", and so on. In various embodiments, block 1210 involves determining a text sentiment for IN_UN-SOLVED. Various ML, non-ML, and natural language processing techniques could be utilized to implement the actions of block 1210.

At block 1220, content orchestration engine 840 could utilize the features determined at block 1210 to identify a textual classification for IN_UNSOLVED. This may involve, for example, forming a feature vector using the results from block 1210. Such a feature vector may be an N-dimensional vector that contains numerical representations of the features identified at blocks 1210. After forming the feature vector, content orchestration engine 840 could provide the feature vector to an ML model that is pre-trained to classify an input feature vector as being an "issue", a "question", an "inquiry", or a "scenario." For example, the ML model could classify IN_UNSOLVED as an "issue" if IN_UNSOLVED contained a negative sentiment and more than a predetermined number of key words from the aforementioned list of pre-defined key words. As another example, the ML model could classify IN_UNSOLVED as a "question" if IN_UNSOLVED began with a word that started with the letters "WH" and had a verbosity metric that was threshold low (e.g., lower than a pre-defined threshold amount of verbosity). As a further example, the ML model could classify IN_UNSOLVED as a "scenario" if the verbosity metric of IN_UNSOLVED is threshold high (e.g., higher than a pre-defined threshold amount of verbosity). As yet another example, the ML model could classify IN_UN-SOLVED as an "inquiry" if IN_UNSOLVED had a neutral text sentiment and had a verbosity metric that was threshold low. Other examples are also possible.

The ML model may take the form of any of the ML models described above in reference to FIG. 6. After applying the ML model on the feature vector, content orchestration engine 840 could identify a textual classification for IN_UNSOLVED.

At block 1230, content orchestration engine 840 could select one or more relevant data sources for IN_UN-SOLVED. This may involve, for example, selecting one or more of support database 820, community database 822, and knowledge database 824 as being a relevant data source for IN_UNSOLVED. The selection at block 1230 may be based on the results from block 1220. For example, support database 820 may contain IT records that are highly relevant for addressing the "inquiry" or "issue" classifications. As such, if IN_UNSOLVED is identified at block 1220 as being an "inquiry" or an "issue", content orchestration 840 may select support database 820 as a relevant data source. As another example, community database 822 and knowledge database 824 may contain IT records that are highly relevant for addressing the "question" or "scenario" classification. Thus, if IN_UNSOLVED is identified at block 1220 as being a "question" or a "scenario", content orchestration 840 may select community database 822 and knowledge database 824 as relevant data sources.

At block 1240, content orchestration engine 840 could select, from the relevant data sources determined at block 1230, a set of relevant IT records. Such a selection could be performed in a variety of ways. In some embodiments, a similarity value could be determined between the IN_UN-SOLVED and each of the IT records disposed in the relevant data sources, and the set of relevant IT records could be based on the determined similarity value. This could include selecting the top n most similar IT records. In some embodiments, the similarity value could be determined based on term frequency metrics for IN_UNSOLVED and term frequency metrics for each of the IT records disposed in the relevant data sources. This could include determining an inner product between the term frequency metrics for IN_UNSOLVED and term frequency metrics for each of the IT records disposed in the relevant data sources, determining a cosine of an angle between the term frequency metrics for IN_UNSOLVED and term frequency metrics for each of the IT records disposed in the relevant data sources, determining an intersection-over-union between the term frequency metrics for IN_UNSOLVED and term frequency metrics for each of the IT records disposed in the relevant data sources, or determining some other measure of similarity.

The term frequency metrics for each of the IT records disposed in the relevant data sources may be pre-calculated via the embodiments of FIG. 11. For example, during procedure 1100, content orchestration engine 840 could store term frequency metrics in support database 820, community database 822, and knowledge database 824, or perhaps another database. Accordingly, because the term frequency metrics for the IT records are pre-calculated, the time it takes content orchestration engine 840 to perform the actions of block 1240 can be greatly reduced.

In some embodiments, however, content orchestration engine 840 may still have to calculate term frequency metrics for tokens in IN_UNSOLVED. In examples, the term frequency metric for a token in IN_UNSOLVED could be determined based on a product of (i) a number of times that the token appears in the IN_UNSOLVED, and (ii) a logarithm of a quotient of a count of the IT records (e.g., the number of IT records in support database 820, community database 822, and/or knowledge database 824) and a count of the records containing the token. This is illustrated by:

$$f_{t,q} \cdot \log \frac{N}{n_t}$$

where $f_{t,q}$ is the number of times the token 't' appears in IN_UNSOLVED, N is the total number of IT records in support database 820, community database 822, and/or knowledge database 824, and $n_t$ is the number of IT records in in support database 820, community database 822, and/or knowledge database 824 which token 't' appears.

At block 1250, content orchestration engine 840 could filter the set of relevant IT records selected at block 1240. Such a filter could be based on a search scope that controls whether an IT record is selected, regardless of the determined similarity value for that IT record. In some examples, setting such a search scope could include controlling an extent to which, for each IT record in the set of relevant IT records, each of the tokens in IN_UNSOLVED is required to be in the tokenized version of the relevant IT record.

For example, such an extent of overlap could be measured by counting the number of tokens that overlap between the IN_UNSOLVED and a particular relevant IT record, and comparing that number to a threshold. In some examples, the amount of overlap could be normalized, e.g., to a number of tokens present in IN_UNSOLVED and/or the particular relevant IT record. For instance, the search scope could be determined for a particular relevant IT record based on a quotient of (i) an intersection of the tokens in IN_UNSOLVED and the tokens in the particular relevant IT record, and (ii) a count of the tokens in IN_UNSOLVED. This is illustrated by:

$$\frac{\|Q \cap S\|}{\|Q\|}$$

where Q is the set of tokens in IN_UNSOLVED, S is the set of tokens in the particular relevant IT record, and double vertical brackets ("|| ||") denotes the number of members of a set.

The search scope could be set by a user. For example, remote network management platform 320 could provide a graphical user interface that contains a drop-down menu for controlling a threshold search scope value, which could be used to set a threshold for the search scope. Such a search scope threshold could be compared to the quotient above in order to determine whether a particular relevant IT record should be filtered out from in the set of relevant records. For example, if the threshold is set to 0.95, then relevant IT records whose overlap (e.g., the value of the quotient above) with the IN_UNSOLVED is less than 95% would be filtered out. As another example, if the threshold is set to 0.65, then relevant IT records whose overlap with IN_UNSOLVED is less than 65% would be filtered out.

The search scope could also be set based on the identified textual classification for IN_UNSOLVED. For example, if IN_UNSOLVED is identified at block 1220 as being a "question" or a "scenario", that identification may result in content orchestration engine 840 setting a higher value (e.g., 0.95) for the search scope. On the other hand, if IN_UN-SOLVED is identified at block 1220 as being a "issue" or a "inquiry", that identification may result in content orchestration engine 840 setting a lower value (e.g., 0.65) for the search scope.

In some embodiments, the filtering at block 1250 could be based on usefulness metrics associated with the set of relevant IT records. Similar to the term frequency metrics, these usefulness metrics could be pre-calculated via the procedure disclosed in FIG. 11 and stored in support database 820, community database 822, knowledge database 824, or some other database. In some examples, relevant IT records associated with low usefulness metrics may be filtered out, as they are less likely to contain useful text-based descriptions. Such IT records may have text-based descriptions that contain few technical terms and/or contain a greater fraction of non-technical terms. In certain examples, relevant IT records associated with very high usefulness metrics may be filtered out, as they are likely to be over-specific, contain non-user-readable content, or to be otherwise unhelpful in resolving a problem. For example, an IT record that contains only code, API calls, program version numbers, or other highly technical content may have a high usefulness index, but may be unhelpful due to the IT record being highly specific and non-generalizable.

Accordingly, in some embodiments, content orchestration engine 840 could filter out, from the set of relevant IT records, IT records that have usefulness indexes outside a specified range. Such a specified range could be provided by a user. For example, a user could adjust the width of the range to increase or decrease the number of IT records that are filtered out. The user could widen (e.g., widen the range of 25% to 75% to 15% to 85%) to decrease the number of IT records that will be filtered out. Conversely, the user could narrow the range (e.g., narrow the range of 15% to 85% to 25% to 75%) to increase the number of IT records that are filtered out.

In certain embodiments, the specified range can be set based on the identified textual classification for IN_UN-SOLVED. For example, if IN_UNSOLVED is identified at block 1220 as being a "question" or a "scenario", that identification may result in content orchestration engine 840 setting a wider (e.g., 15% to 85%) range. On the other hand, if IN_UNSOLVED is identified at block 1220 as being a "issue" or a "inquiry", that identification may result in content orchestration engine 840 setting a narrower (e.g., 25% to 75%) range.

At block 1260, content orchestration engine 840 could proceed with the remainder of procedure 900; i.e., complete the procedures of block 930 and continue with the remainder of procedure 900 by providing the results at block 1250. As discussed above, this could involve displaying the results on support portal 830, community portal 832, and/or knowledge portal 834, or perhaps on another graphical interface.

Note that the blocks represented procedure 1200 are used for the purpose of example and are not intended to be limiting with respect to the embodiments herein. Procedure 1200 may be highly configurable and may include more blocks, fewer blocks, or different blocks than those depicted in FIG. 12. In some cases, one or more blocks may be customized, or may otherwise deviate from the exemplary description above.

VIII. EXAMPLE OPERATIONS

Figure 13:
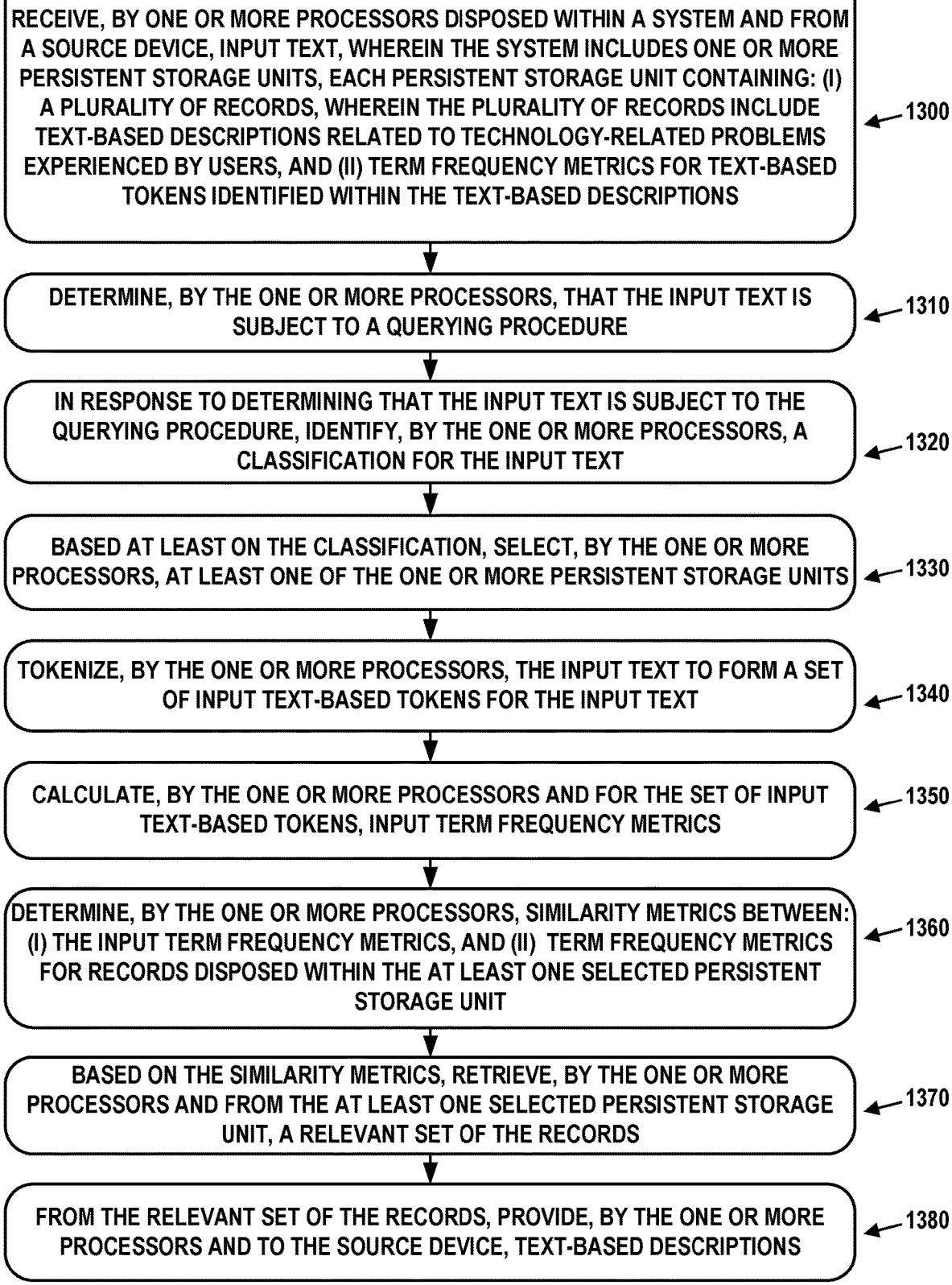
FIG. 13 is a flow chart, in accordance with example embodiments.

FIG. 13 is a flow chart illustrating an example embodiment. The process illustrated by FIG. 13 may be carried out by a computing device, such as computing device 100, and/or a cluster of computing devices, such as server cluster 200. However, the process can be carried out by other types of devices or device subsystems. For example, the process could be carried out by a computational instance of a remote network management platform, one or more processors disposed within a remote network management platform, or a portable computer, such as a laptop or a tablet device. For simplicity, examples will described be using one or more processors disposed within a computing system. However, the embodiments in FIG. 13 can apply in other scenarios as well.

The embodiments of FIG. 13 may be simplified by the removal of any one or more of the features shown therein. Further, these embodiments may be combined with features, aspects, and/or implementations of any of the previous figures or otherwise described herein.

Block 1300 involves receiving, by one or more processors disposed within a system and from a source device, input text. The system includes one or more persistent storage units, each persistent storage unit containing: (i) a plurality of records, where the plurality of records include text-based descriptions related to technology-related problems experienced by users, and (ii) term frequency metrics for text-based tokens identified within the text-based descriptions. The persistent storage units may each be one or more devices, databases, database fields, and/or files that can store records.

Block 1310 involves determining, by the one or more processors, that the input text is subject to a querying procedure.

Block 1320 involves, in response to determining that the input text is subject to the querying procedure, identifying, by the one or more processors, a classification for the input text.

Block 1330 involves, based at least on the classification, selecting, by the one or more processors, at least one of the one or more persistent storage units.

Block 1340 involves tokenizing, by the one or more processors, the input text to form a set of input text-based tokens for the input text.

Block 1350 involves calculating, by the one or more processors and for the set of input text-based tokens, input term frequency metrics.

Block 1360 involves determining, by the one or more processors, similarity metrics between: (i) the input term frequency metrics, and (ii) term frequency metrics for records disposed within the at least one selected persistent storage unit.

Block 1370 involves, based on the similarity metrics, retrieving, by the one or more processors and from the at least one selected persistent storage unit, a relevant set of the records Block 1380 involves from the relevant set of the records, providing, by the one or more processors and to the source device, text-based descriptions.

Some embodiments involve: receiving, from a second source device, second input text, determining that the second input text is not subject to the querying procedure, and, in response determining that the second input text is not subject to the querying procedure, storing, as a record in at least one of the one or more persistent storage units, the second input text and second input term frequency metrics for text-based tokens identified within the second input text.

In some embodiments, both the text-based tokens identified within the text-based descriptions and the input text-based tokens lack stop words, common words, and punctuation, where the stop words comprise a pre-defined list of words related to generic technical topics, and where the common words comprise a pre-defined list of common English language words.

In some embodiments, determining that the input text is subject to the querying procedure comprises: (i) identifying, based on textual content of the input text, a textual sentiment metric, (ii) identifying, based on the textual content of the input text, a verbosity metric, (iii) providing, to a trained ML model, the textual sentiment metric and the verbosity metric, where the trained ML model is configured to receive metrics related to text and output a prediction of whether the text is subject to querying, and (iv) receiving, from the trained ML model, a prediction that the input text is subject to querying.

In some embodiments, the trained ML model is configured to output an accuracy measurement indicating a confidence in the prediction of whether the text is subject to querying. In such embodiments, determining that the input text is subject to the querying procedure comprises determining that an accuracy measurement for the prediction that the input text is subject to querying is higher than a pre-defined threshold accuracy.

In some embodiments, determining that the input text is subject to the querying procedure comprises: identifying a particular web interface through which the input text was provided, and, based on the particular web interface, determining that the input text is subject to the querying procedure.

In some embodiments, a particular term frequency metric is for a text-based token in a text-based description of a particular record in the plurality of records. In such embodiments, the particular term frequency metric is based on a product of: (i) a number of times that the text-based token appears in the text-based description, and (ii) a logarithm of a quotient of a count of the plurality of records and a count of records from the plurality of records that contain the text-based token.

In some embodiments, the relevant set of the records is a sequence of n most similar records ranked based on the similarity metrics.

In some embodiments, retrieving the relevant set of the records comprises filtering out records that do not match a pre-determined search scope, where the pre-determined search scope controls an extent to which, for each relevant record of the relevant set of the records, each of the set of input text-based tokens is required to be in a text-based description of the relevant record.

In some embodiments, the pre-determined search scope is based on a calculation, for each particular record in the relevant set of the records, based on a quotient of (i) an intersection of the set of input text-based tokens and a tokenized versions of the text-based description for the particular record, and (ii) a count of the set of input text-based tokens.

In some embodiments, the input text is entered into a graphical user interface of the source device, where a representation of the graphical user interface was generated and transmitted to the source device by the one or more processors. In such embodiments, the graphical user interface contains a drop-down menu that controls a threshold search scope value, and filtering out records that do not match the pre-determined search scope comprises filtering out records with quotients that are below the threshold search scope value.

Some embodiments involve setting, based on the classification, a threshold search scope value, and wherein filtering out records that do not match the pre-determined search scope comprises filtering out records with quotients that are below the threshold search scope value.

In some embodiments, each persistent storage unit further contains usefulness metrics respectively corresponding to the text-based descriptions. In such embodiments, retrieving the relevant set of the records comprises filtering out records with text-based descriptions that correspond to usefulness metrics outside of a pre-determined range.

In some embodiments, a particular usefulness metric is for a tokenized version of a particular text-based description, and the particular usefulness metric is based on a quotient of: (i) a first count of tokens in the tokenized version of the particular text-based description that lacks stop words, common words, and punctuation, and (ii) a second count of tokens in the tokenized version of the particular text-based description that includes the stop words, common words, and punctuation, where the stop words comprise a pre-defined list of words related to generic technical topics, and where the common words comprise a pre-defined list of common English language words.

In some embodiments, the pre-determined range is based on the classification.

In some embodiments, a system could include means for receiving, from a source device, input text. In such embodiments, the system may include one or more persistent storage units, each persistent storage unit containing: (i) a plurality of records, where the plurality of records include text-based descriptions related to technology-related problems experienced by users, and (ii) term frequency metrics for text-based tokens identified within the text-based descriptions. The system could also include means for determining that the input text is subject to a querying procedure. The system could further include means for, in response to determining that the input text is subject to the querying procedure, identifying a classification for the input text. The system could additionally include means for, based at least on the classification, selecting at least one of the one or more persistent storage units. The system could even further include means for tokenizing the input text to form a set of input text-based tokens for the input text. The system could also include means for calculating, for the set of input text-based tokens, input term frequency metrics. The system could additionally include means for determining similarity metrics between: (i) the input term frequency metrics, and (ii) term frequency metrics for records disposed within the at least one selected persistent storage unit. The system could additionally include means for, based on the similarity metrics, retrieving, from the at least one selected persistent storage unit, a relevant set of the records. The system could further include means for providing, from the relevant set of the records, and to the source device, text-based descriptions.

IX. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
    one or more persistent storage units, each persistent storage unit containing: (i) a plurality of records, wherein the plurality of records include text-based descriptions related to technology-related problems experienced by users, and (ii) term frequency metrics for text-based tokens identified within the text-based descriptions; and
    one or more processors configured to perform operations, including:
        receiving, from a source device, input text;
        determining that the input text is subject to a querying procedure;
        in response to determining that the input text is subject to the querying procedure, identifying a classification for the input text;
        based at least on the classification, selecting at least one of the one or more persistent storage units;
        tokenizing the input text to form a set of input text-based tokens for the input text;
        calculating, for the set of input text-based tokens, input term frequency metrics;
        determining similarity metrics between: (i) the input term frequency metrics, and (ii) term frequency metrics for records disposed within the at least one selected persistent storage unit;
        based on the similarity metrics, retrieving, from the at least one selected persistent storage unit, a relevant set of the records; and
        providing, to the source device and from the relevant set of the records, text-based descriptions.

2. The system of claim 1, wherein the operations further include:
    receiving, from a second source device, second input text;
    determining that the second input text is not subject to the querying procedure; and
    in response determining that the second input text is not subject to the querying procedure, storing, as a record in at least one of the one or more persistent storage units, the second input text and second input term frequency metrics for text-based tokens identified within the second input text.

3. The system of claim 1, wherein both the text-based tokens identified within the text-based descriptions and the input text-based tokens lack stop words, common words, and punctuation, wherein the stop words comprise a pre-defined list of words related to generic technical topics, and wherein the common words comprise a pre-defined list of common English language words.

4. The system of claim 1, wherein determining that the input text is subject to the querying procedure comprises:
    identifying, based on textual content of the input text, a textual sentiment metric;
    identifying, based on the textual content of the input text, a verbosity metric;
    providing, to a trained machine learning (ML) model, the textual sentiment metric and the verbosity metric, wherein the trained ML model is configured to receive metrics related to text and output a prediction of whether the text is subject to querying; and
    receiving, from the trained ML model, a prediction that the input text is subject to querying.

5. The system of claim 4, wherein the trained ML model is configured to output an accuracy measurement indicating a confidence in the prediction of whether the text is subject to querying, and wherein determining that the input text is subject to the querying procedure comprises:
    determining that an accuracy measurement for the prediction that the input text is subject to querying is higher than a pre-defined threshold accuracy.

6. The system of claim 1, wherein determining that the input text is subject to the querying procedure comprises:
    identifying a particular web interface through which the input text was provided, and
    based on the particular web interface, determining that the input text is subject to the querying procedure.

7. The system of claim 1, wherein a particular term frequency metric is for a text-based token in a text-based description of a particular record in the plurality of records, and wherein the particular term frequency metric is based on a product of: (i) a number of times that the text-based token appears in the text-based description, and (ii) a logarithm of a quotient of a count of the plurality of records and a count of records from the plurality of records that contain the text-based token.

8. The system of claim 1, wherein the relevant set of the records is a sequence of n most similar records ranked based on the similarity metrics.

9. The system of claim 1, wherein retrieving the relevant set of the records comprises filtering out records that do not match a pre-determined search scope, wherein the pre-determined search scope controls an extent to which, for each relevant record of the relevant set of the records, each of the set of input text-based tokens is required to be in a text-based description of the relevant record.

10. The system of claim 9, wherein the pre-determined search scope is based on a calculation, for each particular record in the relevant set of the records, based on a quotient of (i) an intersection of the set of input text-based tokens and a tokenized versions of the text-based description for the particular record, and (ii) a count of the set of input text-based tokens.

11. The system of claim 10, wherein the input text is entered into a graphical user interface of the source device, wherein a representation of the graphical user interface was generated and transmitted to the source device by the one or more processors, and wherein the graphical user interface contains a drop-down menu that controls a threshold search scope value, and wherein filtering out records that do not match the pre-determined search scope comprises:
filtering out records with quotients that are below the threshold search scope value.

12. The system of claim 10, wherein the operations further comprise setting, based on the classification, a threshold search scope value, and wherein filtering out records that do not match the pre-determined search scope comprises filtering out records with quotients that are below the threshold search scope value.

13. The system of claim 1, wherein each persistent storage unit further contains usefulness metrics respectively corresponding to the text-based descriptions, and wherein retrieving the relevant set of the records comprises filtering out records with text-based descriptions that correspond to usefulness metrics outside of a pre-determined range.

14. The system of claim 13, wherein a particular usefulness metric is for a tokenized version of a particular text-based description, and wherein the particular usefulness metric is based on a quotient of: (i) a first count of tokens in the tokenized version of the particular text-based description that lacks stop words, common words, and punctuation, and (ii) a second count of tokens in the tokenized version of the particular text-based description that includes the stop words, common words, and punctuation, wherein the stop words comprise a pre-defined list of words related to generic technical topics, and wherein the common words comprise a pre-defined list of common English language words.

15. The system of claim 13, wherein the pre-determined range is based on the classification.

16. A computer-implemented method comprising:
receiving, by one or more processors disposed within a system and from a source device, input text, wherein the system includes one or more persistent storage units, each persistent storage unit containing: (i) a plurality of records, wherein the plurality of records include text-based descriptions related to technology-related problems experienced by users, and (ii) term frequency metrics for text-based tokens identified within the text-based descriptions;
determining, by the one or more processors, that the input text is subject to a querying procedure;
in response to determining that the input text is subject to the querying procedure, identifying, by the one or more processors, a classification for the input text;
based at least on the classification, selecting, by the one or more processors, at least one of the one or more persistent storage units;
tokenizing, by the one or more processors, the input text to form a set of input text-based tokens for the input text;
calculating, by the one or more processors and for the set of input text-based tokens, input term frequency metrics;
determining, by the one or more processors, similarity metrics between: (i) the input term frequency metrics, and (ii) term frequency metrics for records disposed within the at least one selected persistent storage unit;
based on the similarity metrics, retrieving, by the one or more processors and from the at least one selected persistent storage unit, a relevant set of the records; and
from the relevant set of the records, providing, by the one or more processors and to the source device, text-based descriptions.

17. The computer-implemented method of claim 16, further comprising:
receiving, from a second source device, second input text;
determining that the second input text is not subject to the querying procedure; and
in response determining that the second input text is not subject to the querying procedure, storing, as a record in at least one of the one or more persistent storage units, the second input text and second input term frequency metrics for text-based tokens identified within the second input text.

18. The computer-implemented method of claim 16, wherein determining that the input text is subject to the querying procedure comprises:
identifying, based on textual content of the input text, a textual sentiment metric;
identifying, based on the textual content of the input text, a verbosity metric;
providing, to a trained machine learning (ML) model, the textual sentiment metric and the verbosity metric, wherein the trained ML model is configured to receive metrics related to text and output a prediction of whether the text is subject to querying; and
receiving, from the trained ML model, a prediction that the input text is subject to querying.

19. The computer-implemented method of claim 16, wherein a particular term frequency metric is for a text-based token in a text-based description of a particular record in the plurality of records, and wherein the particular term frequency metric is based on a product of: (i) a number of times that the text-based token appears in the text-based description, and (ii) a logarithm of a quotient of a count of the plurality of records and a count of records from the plurality of records that contain the text-based token.

20. An article of manufacture including a non-transitory computer-readable medium, having stored thereon program instructions that, upon execution by a computing system, cause the computing system to perform operations comprising:
receiving, from a source device, input text, wherein the computing system includes one or more persistent storage units, each persistent storage unit containing: (i) a plurality of records, wherein the plurality of records include text-based descriptions related to technology-related problems experienced by users, and (ii) term frequency metrics for text-based tokens identified within the text-based descriptions;
determining that the input text is subject to a querying procedure;
in response to determining that the input text is subject to the querying procedure, identifying a classification for the input text;
based at least on the classification, selecting at least one of the one or more persistent storage units;
tokenizing the input text to form a set of input text-based tokens for the input text;
calculating, for the set of input text-based tokens, input term frequency metrics;
determining similarity metrics between: (i) the input term frequency metrics, and (ii) term frequency metrics for records disposed within the at least one selected persistent storage unit;
based on the similarity metrics, retrieving, from the at least one selected persistent storage unit, a relevant set of the records; and providing, from the relevant set of the records and to the source device, text-based descriptions.

\* \* \* \* \*